(12) United States Patent
Xiao et al.

(10) Patent No.: US 7,988,266 B2
(45) Date of Patent: Aug. 2, 2011

(54) INK CARTRIDGE FOR INKJET PRINTER

(75) Inventors: Qingguo Xiao, Zhuhai (CN); Benyou Jin, Zhuhai (CN); Leung Mui Ho, Zhuhai (CN); Yonggang He, Zhuhai (CN); Yongzhong Tian, Zhuhai (CN)

(73) Assignee: Print-Rite Technology Development Co., Ltd. of Zhuhai, Zhuhai (CN)

( * ) Notice: Subject to any disclaimer, the term of this patent is extended or adjusted under 35 U.S.C. 154(b) by 977 days.

(21) Appl. No.: 11/727,423

(22) Filed: Mar. 26, 2007

(65) Prior Publication Data

US 2007/0222840 A1   Sep. 27, 2007

(30) Foreign Application Priority Data

Mar. 24, 2006 (CN) ............ 2006 1 0071376
Mar. 29, 2006 (CN) ............ 2006 2 0057250

(51) Int. Cl.
*B41J 2/175* (2006.01)
(52) U.S. Cl. ............ 347/84; 347/85; 347/86; 251/84
(58) Field of Classification Search ............ 347/86
See application file for complete search history.

(56) References Cited

U.S. PATENT DOCUMENTS

| | | | |
|---|---|---|---|
| 4,513,784 A | 4/1985 | Farrand et al. | |
| 6,145,974 A * | 11/2000 | Shinada et al. | 347/87 |
| 6,511,168 B2 * | 1/2003 | Higuma | 347/86 |
| 6,837,575 B2 * | 1/2005 | Usui | 347/85 |
| 2001/0006396 A1 * | 7/2001 | Iida | 347/86 |
| 2003/0076392 A1 * | 4/2003 | Anderson et al. | 347/86 |
| 2003/0107626 A1 | 6/2003 | Qingguo et al. | |
| 2004/0017447 A1 * | 1/2004 | Suzuki et al. | 347/86 |
| 2004/0233258 A1 * | 11/2004 | Kitabatake et al. | 347/85 |

FOREIGN PATENT DOCUMENTS

| | | |
|---|---|---|
| CN | 2900171 | 5/2007 |
| EP | 1384589 | 1/2004 |

OTHER PUBLICATIONS

International Search Report of PCT/CN2007/000952.
Written Opinion of PCT/CN2007/000952.
European search report of counterpart European patent application.

* cited by examiner

*Primary Examiner* — Laura Martin

(57) ABSTRACT

A valve core of an ink cartridge includes an elastic valve sheet having an inner portion and an outer portion. The outer portion extends outwards from the inner portion and protrudes towards an upstream side of the valve core. The outer portion is adapted to sealingly engage and disengage with a valve seat in which the valve core is mounted.

35 Claims, 33 Drawing Sheets

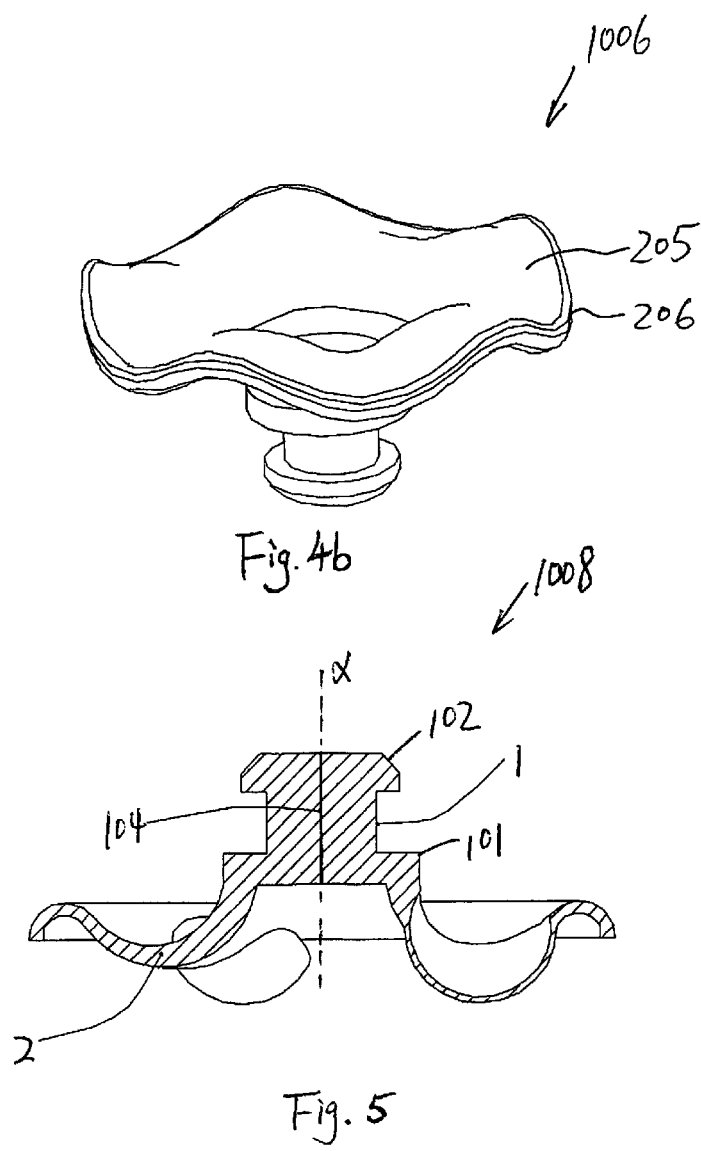

INK CARTRIDGE FOR INKJET PRINTER

CROSS REFERENCES

The present application claims priorities from Chinese Patent Application No. 200610071376.7 filed Mar. 24, 2006 and Chinese Patent Application No. 200620057250.X filed Mar. 29, 2006.

FIELD OF APPLICATION

The present application relates to an ink cartridge for an inkjet printer.

BACKGROUND

An ink cartridge for an inkjet printer is used for supplying ink to a recording head. The conventional ink cartridge utilizes an ink storage chamber. A porous material such a sponge is provided inside the ink storage chamber to generate pressure. An ink supply chamber is in fluid communication with the ink storage chamber by means of openings provided on one side wall thereof. An inkjet port is provided on another side wall of the ink storage cartridge. The ink cartridge, including the ink storage chamber, the ink supply chamber and the inkjet port, is detachably installed on an ink cartridge of the inkjet printer. The ink cartridge is connected to the recording head for supplying ink thereto. The surface tension of the porous material provided inside the ink storage chamber can prevent the ink from leaking.

SUMMARY

This application is directed to an ink cartridge for an inkjet printer. In one aspect, a valve core of an ink cartridge is provided. The valve core includes an elastic valve sheet having an inner portion and an outer portion. The outer portion extends outwards from the inner portion and protrudes towards an upstream side of the valve core. The outer portion is adapted to sealingly engage and disengage with a valve seat in which the valve core is mounted.

In another aspect, a valve assembly of an ink cartridge is provided. The valve assembly includes a valve core and a valve seat. The valve core includes an elastic valve sheet having an inner portion and an outer portion. The outer portion extends outwards from the inner portion and protrudes towards an upstream side of the valve core. The valve seat includes a valve chamber in which the valve sheet of the valve core is disposed. The valve chamber has an inner surface. The outer portion of the valve sheet is adapted to sealingly engage and disengage with the inner surface of the valve chamber.

In another aspect, an ink cartridge is provided. The ink cartridge includes an ink supply chamber adapted to contain ink, an ink supply port adapted to supply the ink to a print head, and a valve assembly positioned between the ink supply chamber and the ink supply port. The valve assembly includes a valve core and a valve seat. The valve core includes an elastic valve sheet having an inner portion and an outer portion. The outer portion extends outwards from the inner portion and protrudes towards an upstream side of the valve core. The valve seat includes a valve chamber in which the valve sheet of the valve core is disposed. The valve chamber has an inner surface. The outer portion of the valve sheet is adapted to sealingly engage and disengage with the inner surface of the valve chamber.

BRIEF DESCRIPTION OF THE DRAWINGS

FIG. 1c is a sectional view of the valve core of FIG. 1a.

FIG. 2c is a sectional view of the valve core of FIG. 2a.

FIG. 3c is a sectional view of the valve core of FIG. 3a.

FIG. 4b is a perspective view of the valve core of FIG. 4a in opposite direction.

FIG. 5 is a cross sectional view of a fifth embodiment of a valve core of a valve assembly of an ink cartridge.

FIG. 10b is an enlarged view of a groove of the valve assembly of FIG. 10a.

FIG. 17b is a partial enlarged sectional view of the ink cartridge of FIG. 17a.

FIG. 18b is a partial enlarged sectional view of the ink cartridge of FIG. 18a.

FIG. 31b is a perspective view of an embodiment of a buffering member of the valve assembly of FIG. 31a.

DETAILED DESCRIPTION

Figure 1A:
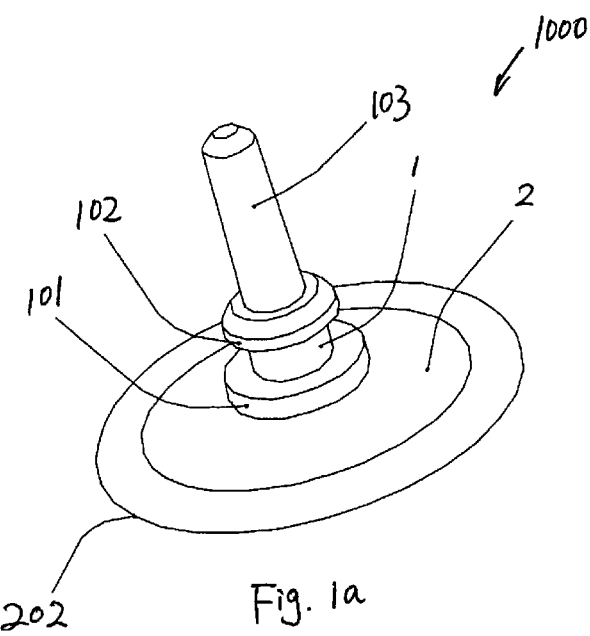
FIG. 1a is a perspective view of a first embodiment of a valve core of a valve assembly of an ink cartridge.
Figure 1B:
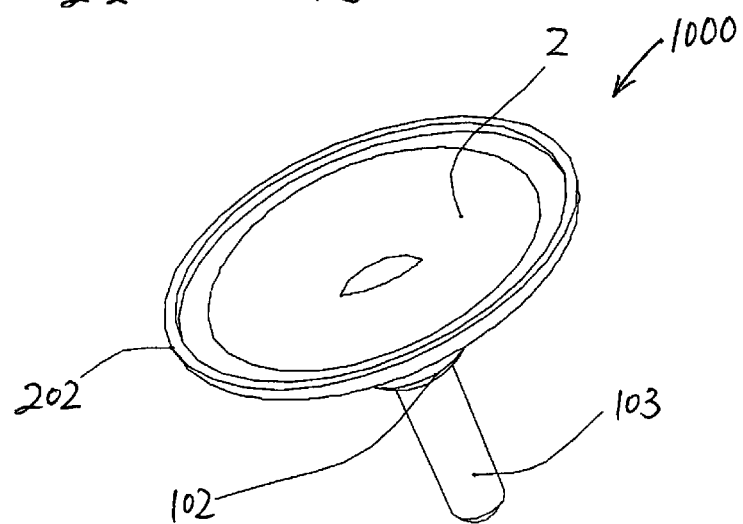
FIG. 1b is a perspective view of the valve core of FIG. 1a in opposite direction.
Figure 1C:
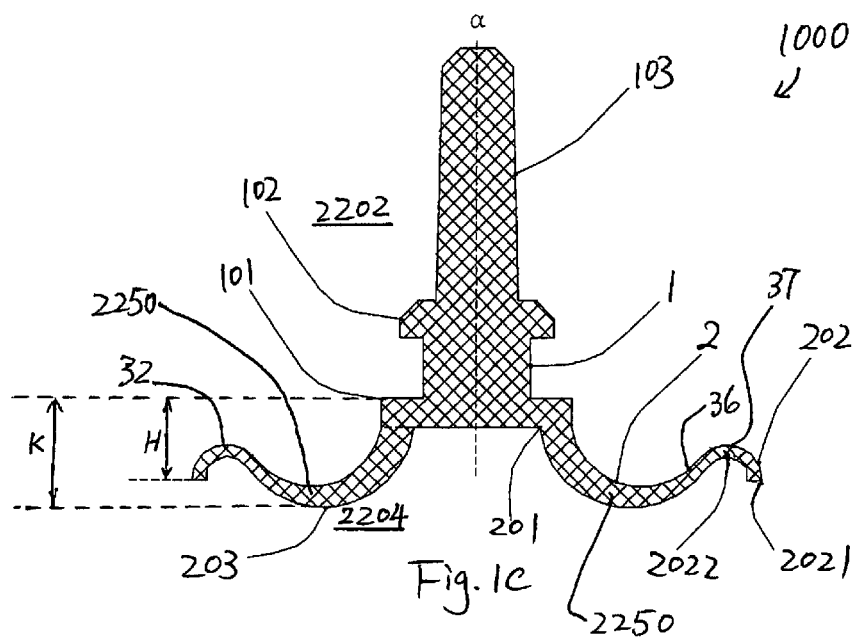

FIGS. 1a, 1b and 1c show a first embodiment of a valve core 1000 of a valve assembly of an ink cartridge.

The valve core 1000 includes a valve sheet 2 extending outwards from a generally central portion of the valve core 1000. A valve stem 1 can be provided at the generally central portion of the valve core 1000. The valve stem 1 and the valve sheet 2 can share a common axis. The valve sheet 2 is made of elastic material, such as rubber, silicon rubber or synthetic rubber, etc. The valve stem 1 and the valve sheet 2 are formed integrally in the illustrated embodiment. Alternatively, the valve stem 1 and the valve sheet 2 may be formed separately and fixedly joined together by gluing, riveting, welding or heat fusion, etc. The valve stem 1 may also be made of elastic material, such as rubber, silicon rubber or synthetic rubber, etc., or made of other non-elastic materials.

The circumference of the valve stem 1 may be generally circular in shape. This allows the valve core 1000 to be easily positioned in a corresponding valve opening of a valve seat. Other shapes of the circumference of the valve stem 1, such an as equilateral triangle, square, or irregular polygon, may be used. The valve opening of the valve seat used for receiving the valve stem 1 may have a corresponding shape. The shape of the valve sheet 2 may be circular or polygon. A valve chamber of the valve seat may have a corresponding circular or polygon shape.

The valve sheet 2 has an inner end 201 adjacent to the generally central portion of the valve sheet. The inner end 201 of the valve sheet 2 has the smallest radial dimension. In the illustrated embodiment, the inner end 201 is adjacent to the valve stem 1. The inner end 201 is fixedly connected to an engaging portion 101 of the stem 1 in such a manner that the outer surface at the connection is continuous and smooth. The engaging portion 101 extends slightly outwards in the radial direction such that its radial dimension may be larger than that of the valve stem 1. The engaging portion 101 has an appropriate thickness, so as to provide a sufficient support for the valve sheet 2. A protruding portion 102 of the valve stem 1 extends outwards in the radial direction and may be formed at a position of the valve stem 1 which is at a certain distance from the engaging portion 101 along axis α. The protruding portion 102 and engaging portion 101 allow the valve core 1000 to be fixedly mounted in a valve seat (referring to FIG. 7). The protruding portion 102 may be replaced by any other suitable protrusion. It is understood by one skilled in the art that the protruding portion 102 may be eliminated if the valve stem 1 is fixed to the valve opening, such as by using glue or other method. The length of the valve stem 1 can be different if the valve core 1000 is used with different ink cartridges. A valve stem extension 103 may extend from the protruding portion 102 to a certain distance along the axis α of the valve stem 1. It is understood by one skilled in the art that the valve stem extension 103 may be eliminated or cut away.

The valve sheet 2 has an outer end 202 remote to the generally central portion of the valve sheet 2. The outer end 202 has the largest radial dimension. In the illustrated embodiment, the outer end 202 is remote to the valve stem 1. The outer end 202 is located at a lower side of the engaging portion 101. The outer end 202 extends towards the downstream side 2204 of the valve core 1000 to form an edge 2021, which may or may not curl slightly inwards. The edge 2021 of the valve sheet 2 is at a distance "H" from the upper surface of the engaging end 101 in the axial direction. The distance "H" can be different for different valve core depending upon the size of the ink cartridge used.

The valve sheet 2 includes an inner portion 2250 extending outwards from the generally central portion of the valve sheet 2. In the illustrated embodiment, the inner portion 2250 extends outwards from the valve stem 1.

An outer portion 2022 extends outwards from the inner portion 2250. The outer portion 2022 of the valve sheet 2 protrudes towards the upstream side 2202 of the valve core 1000. The inner portion 2250 of the valve sheet 2 protrudes towards the downstream side 2204 of the valve core 1000 away from the inner end 201. In the illustrated embodiment, the outer portion 2022 has a curved surface 32. The outer portion 2022 extends outwards from the inner portion 2250 at an intermediate region 36. The intermediate region 36 is smooth and continuous. The cross section of the outer portion 2022 is a general C-shape, and the cross section of the inner portion 2250 of the valve sheet 2 is also a general C-shape. The cross section the valve sheet 2 is a general S-shape.

The inner portion 2250 of the valve sheet 2 extends a distance from the valve stem 1 in the axial direction farther than that of the outer portion 2022. In particular, the distance "K" from the protruding end 203 of the inner portion 2250 to the upper surface of the engaging portion 101 along the axial direction is greater than the distance "H" from the edge 2021 to the upper surface of the engaging portion 101 along the axial direction. The distance "K" can be different for different valve core depending upon the size of the ink cartridge used.

In use, the outer portion 2022 is mainly served to detect the change in liquid pressure and to perform a sealing function to open or close the liquid passage. The inner portion 2250 assists the outer portion 2022 to stretch or deflect in response to the difference in pressure between the upstream and downstream sides 2202 and 2204 of the valve core 1000.

In the illustrated embodiment, the thickness of inner portion 2250 decreases gradually from the inner end 201 of the inner portion 2250 to the intermediate region 36. The thickness at the protruding end 37 of the outer portion 2022 is equal to or less than the thickness at the intermediate region 36 and the thickness at the edge 2021 of the outer portion 2022. The protruding end 37 is located between the intermediate region 36 and the edge 2021. In the illustrated embodiment, the protruding end 37 is in the approximate midway of the intermediate region 36 and the edge 2021 and is can be served as a sealing region to engage with a valve seat. The thickness at the protruding end 37 is generally about 0.1 mm to about 0.5 mm. According to a further embodiment, the thickness at the protruding end 37 is about 0.15 mm to about 0.25 mm. The protruding end 37 in these thickness ranges may be sensitive to the liquid pressure, and may carry out the operation of opening and closing the liquid passage effectively.

When the valve core 1000 is used with a valve seat, the valve stem 1 is positioned into a corresponding valve opening of the valve seat (referring to FIG. 8, the valve stem opening 304 in the valve seat 3), and then the valve core 1000 is fixed on the valve seat by the protruding portion 102 and the engaging portion 101. The valve sheet 2 serves to open or close the valve in a valve chamber inside the valve seat (referring to FIG. 7, the valve chamber 301 in the valve seat 3).

Figure 29:
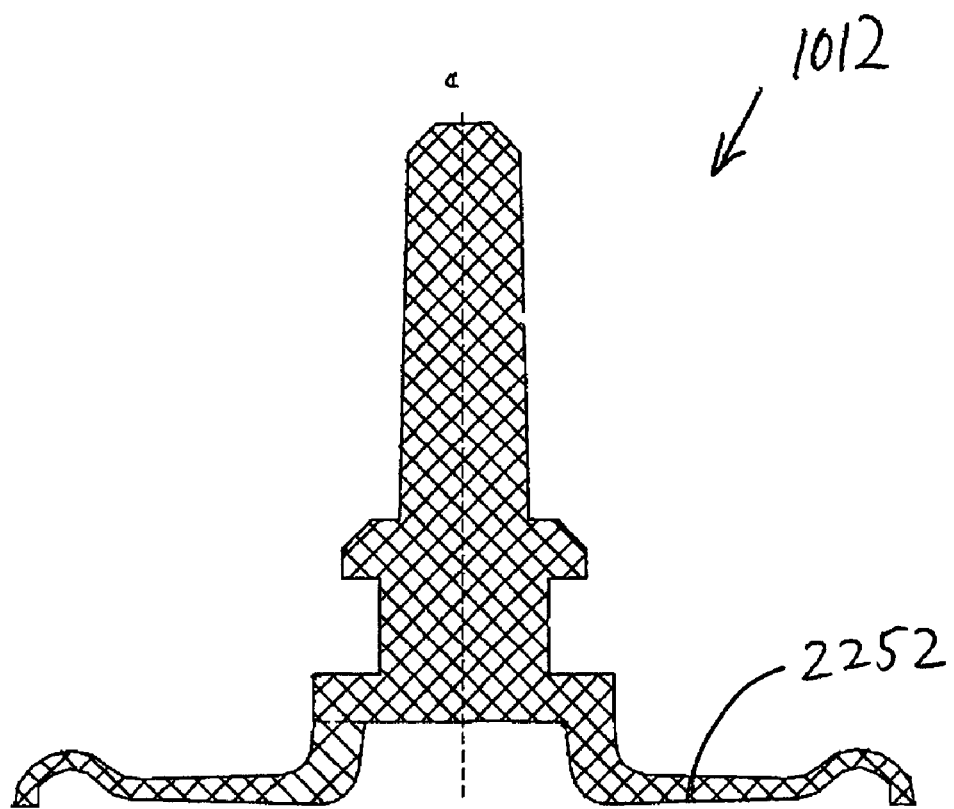
FIG. 29 is a sectional view of another embodiment of a valve core of a valve assembly of an ink cartridge.
Figure 30:
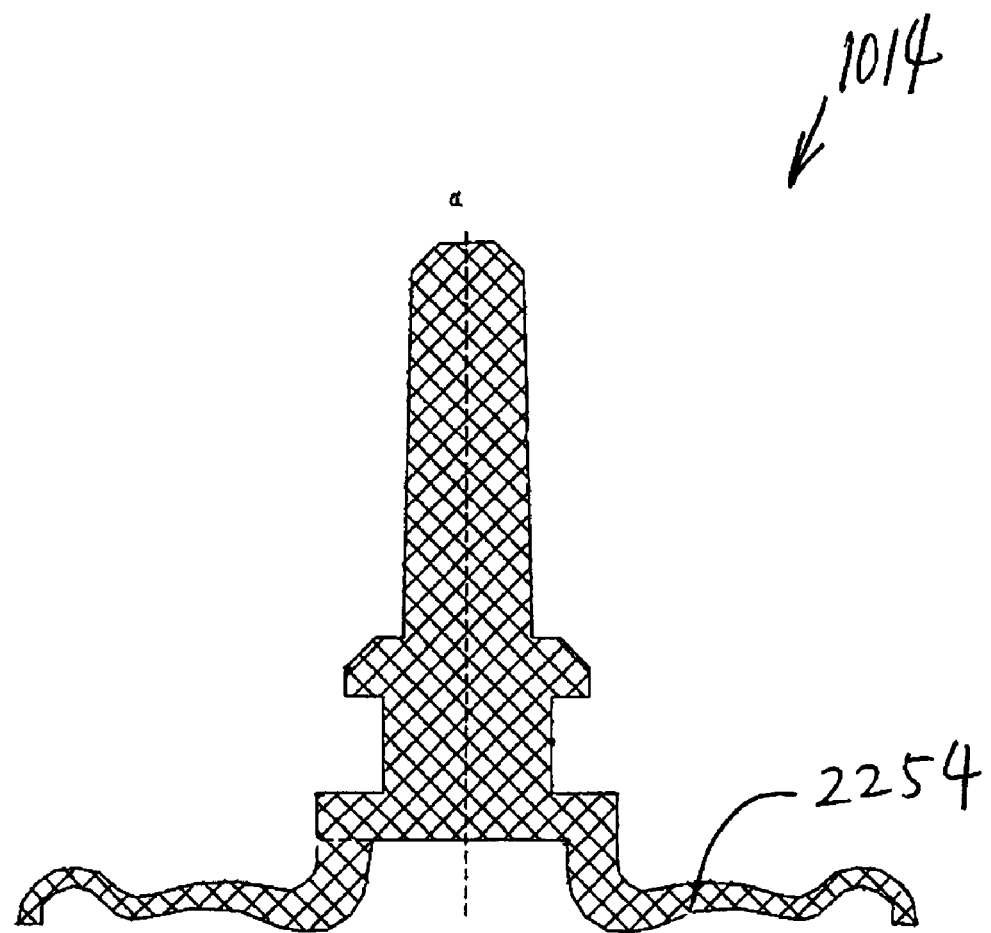
FIG. 30 is a sectional view of yet another embodiment of a valve core of a valve assembly of an ink cartridge.

Although it has been shown in the first embodiment that the inner portion 2250 of the valve sheet 2 protrudes towards the downstream side 2204 of the valve core 1000, it is understood by one skilled in the art that the inner portion 2252 can be linear as shown in a valve core 1012 in FIG. 29. It is also understood by one skilled in the art that the inner portion 2254 can slightly protrude towards the upstream side of the valve core as shown in a valve core 1014 in FIG. 30.

Figure 2A:
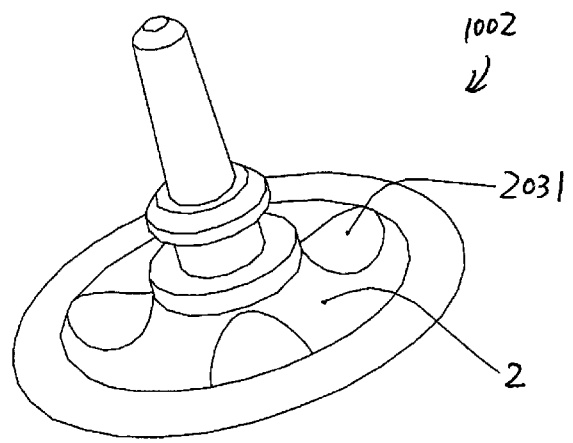
FIG. 2a is a perspective view of a second embodiment of a valve core of a valve assembly of an ink cartridge.
Figure 2B:
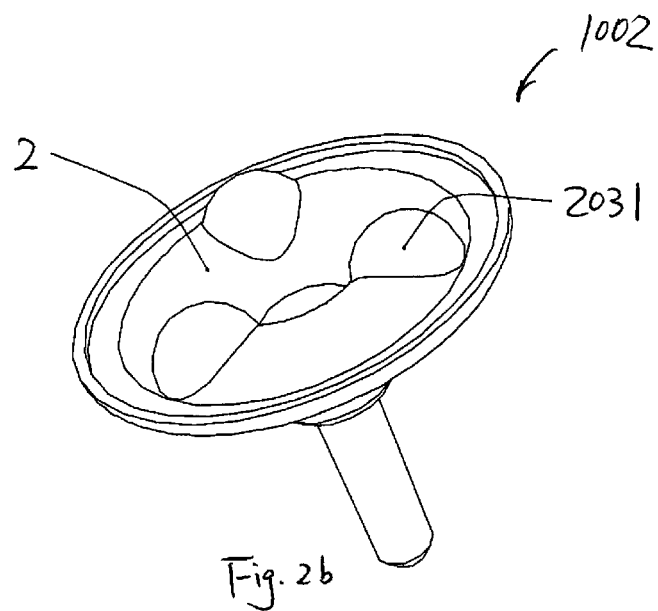
FIG. 2b is a perspective view of the valve core of FIG. 2a in opposite direction.
Figure 2C:
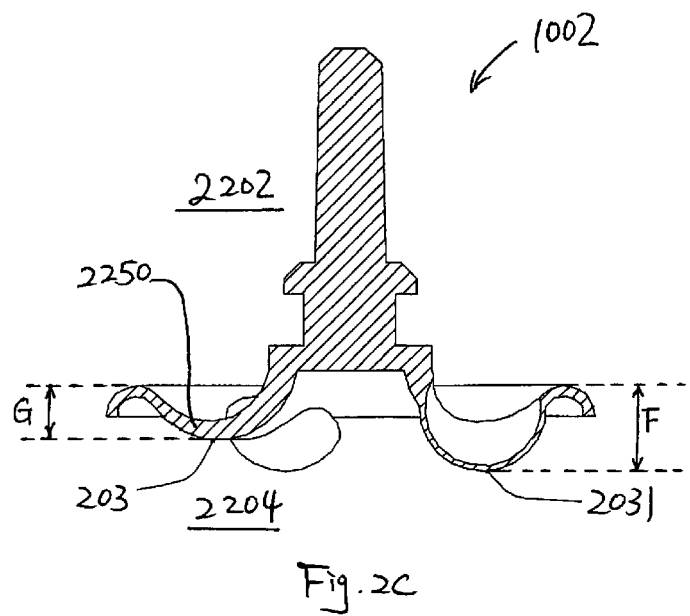

FIGS. 2a, 2b and 2c show a second embodiment of a valve core 1002 of a valve assembly of an ink cartridge.

The main structures of the second valve core 1002 are the same as those of the first valve core 1000. The second valve core 1002 is different from the first valve core 1000 in that the second valve core 1002 includes one or more concave portions 2031, which is disposed on the inner portion 2250 of the valve sheet 2. In the illustrated embodiment, there are three concave portions 2031 equidistantly and radially disposed on the inner portion 2250 of the valve sheet 2.

In the illustrated embodiment, the concave portions 2031 protrude towards the downstream side 2204 of the valve core 1002. The depth "F" of the end of each concave portion 2031 is greater than the depth "G" of the projecting end 203. The thickness of the each concave portion 2031 is less than the thickness of the inner portion 2250. These concave portions 2031 can make the valve sheet 2 to stretch or deflect to a certain extent and improve the sensitivity of detecting the change in ink pressure, such that the ability of the valve sheet 2 in adjusting the flow of the ink can be further improved.

Figure 3A:
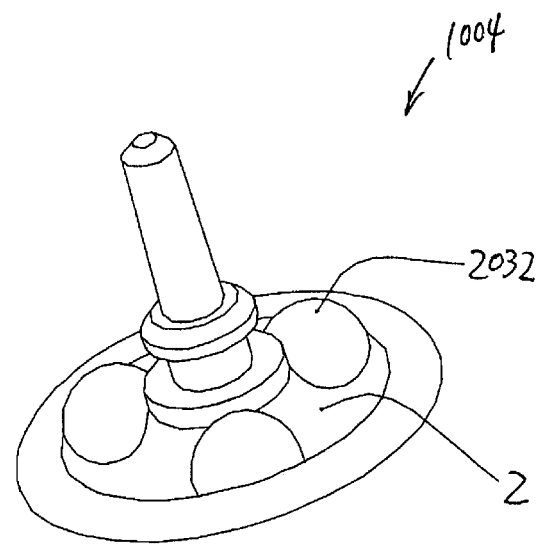
FIG. 3a is a perspective view of a third embodiment of a valve core of a valve assembly of an ink cartridge.
Figure 3B:
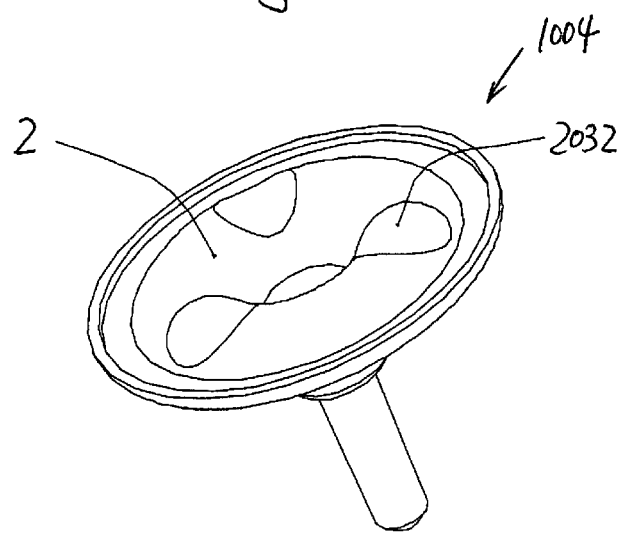
FIG. 3b is a perspective view of the valve core of FIG. 3a in opposite direction.
Figure 3C:
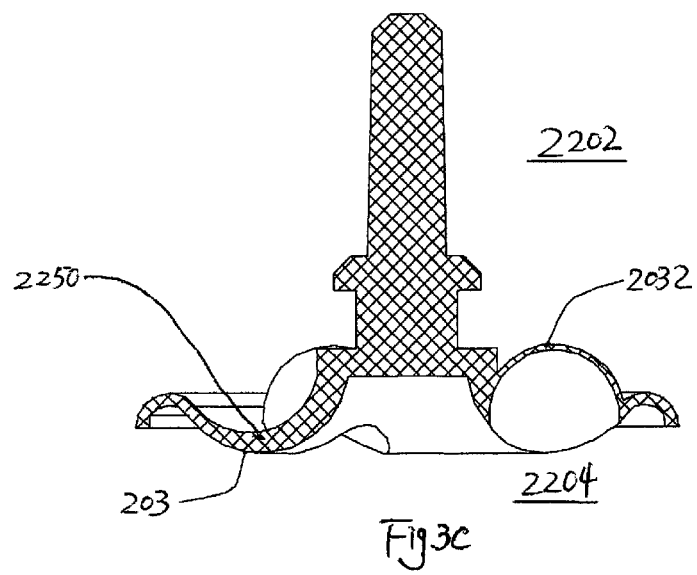

FIGS. 3a, 3b and 3c show a third embodiment of a valve core 1004 of a valve assembly of an ink cartridge.

The main structures of the third valve core 1004 are the same as those of the first valve core 1000. The third valve core 1004 is different from the first valve core 1000 in that the third valve core 1004 adds one or more concave portions 2032, which is disposed on the inner portion 2250 of the valve sheet 2. In the illustrated embodiment, there are three concave portions 2032 equidistantly and radially disposed on the inner portion 2250 of the valve sheet 2.

The concave portions 2032 protrude towards the upstream side 2202 of the valve core 1002. The thickness of the each concave portion 2032 is less than the thickness of the inner portion 2250. These concave portions 2032 can make the valve sheet 2 to stretch or deflect to a certain extent and improve the sensitivity of detecting the change in ink pressure, such that the ability of the valve sheet 2 in adjusting the flow of the ink can be further improved.

Although it has been shown in the second and third embodiments that the valve core is provided with three concave portions protruding towards the upstream or downstream side of the valve core, it is understood by one skilled in the art that the valve core may have more or less than three concave portions protruding towards the upstream or downstream side of the valve core, or protruding towards both upstream and downstream sides of the valve core.

Figure 4A:
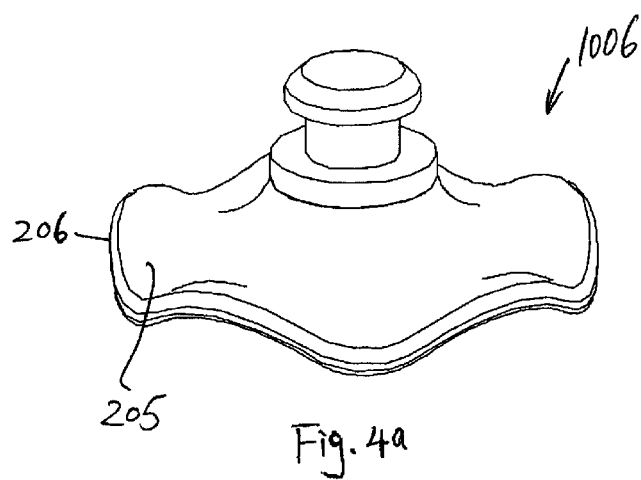
FIG. 4a is a perspective view of a fourth embodiment of a valve core of a valve assembly of an ink cartridge.

FIGS. 4a and 4b show a fourth embodiment of a valve core 1006 of a valve assembly of an ink cartridge.

The main structures of the fourth valve core 1006 are similar to those of the valve core in FIG. 1. The difference is that the outer portion 205 is in a wavy configuration along its circumference. The outer end 206, which is remote to a generally central portion of the valve core 1006, is adapted to sealingly engage or disengage with a valve seat in which the valve core is mounted.

FIG. 5 shows a fifth embodiment of a valve core 1008 of a valve assembly of an ink cartridge.

The main structures of the fifth valve core 1008 are the same as those of the valve cores in FIGS. 1-4. The difference is that the valve stem extension of the valve stem 1 is cutaway. The valve stem 1 is provided with a passageway along the axis α thereof. In the illustrated embodiment, the passageway is a slit 104 extending through the valve stem 1 from the engaging portion 101 to the protruding portion 102. With this structure, when the valve core 1008 is used with a valve seat, the valve sheet 2 allows the passage of ink from the upstream side to the downstream side of the valve core 1008. At the same time, the slit 104 allows passage of liquid in the opposite direction. Therefore, the valve core 1008 of the present embodiment is a bi-directional valve core allowing ink to flow in both directions. The valve core 1008 can meet the ink supplying requirement for applying ink to the ink supply port, and the decompression requirement of decrease in the effective ink volume due to the insert of the ink supply needle to the ink supply port. The valve core 1008 has a stronger ability to control the ink flowing and adjust the ink pressure state.

Figure 6:
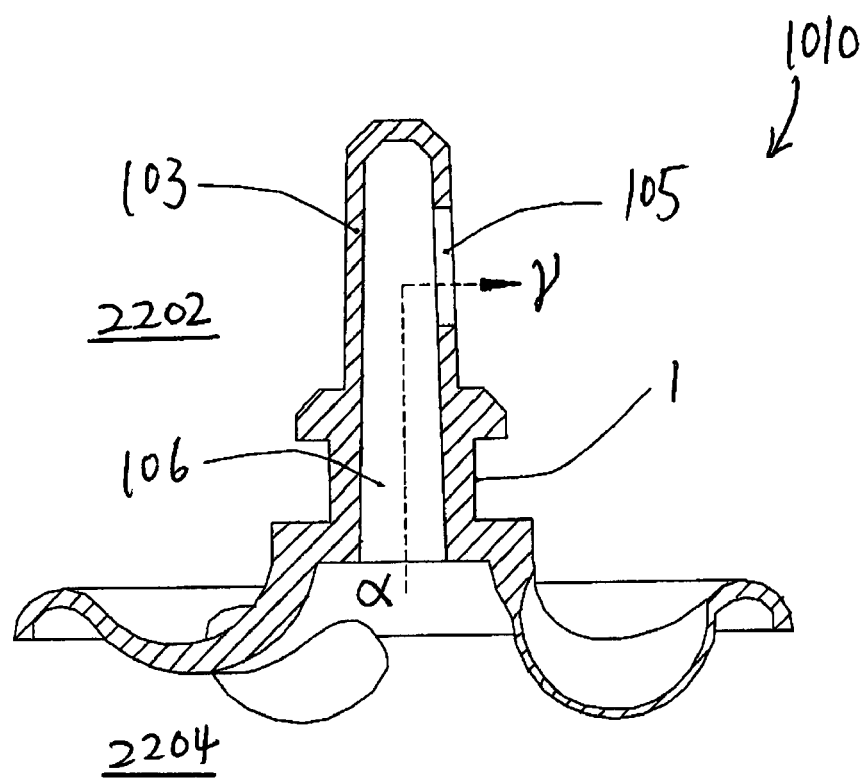
FIG. 6 is a cross sectional view of a sixth embodiment of a valve core.

FIG. 6 shows the sixth embodiment of a valve core 1010 of a valve assembly of an ink cartridge.

The main structures of the sixth valve core 1010 are the same as those of the valve cores in FIGS. 1-4. The difference is that a passageway 106 is formed inside the valve stem 1 and the valve stem extension 103. One end of the passageway 106 facing the downstream side 2204 of the valve core 1010 is open, while the opposing end of the passageway 106 is closed. The side wall of the valve stem extension 103 in the axis α direction has a slit 105 provided therethrough. The slit 105 is open in the direction shown by the dashed line γ. The sixth valve core 1010 has the same function as the fifth valve core 1008.

Figure 7:
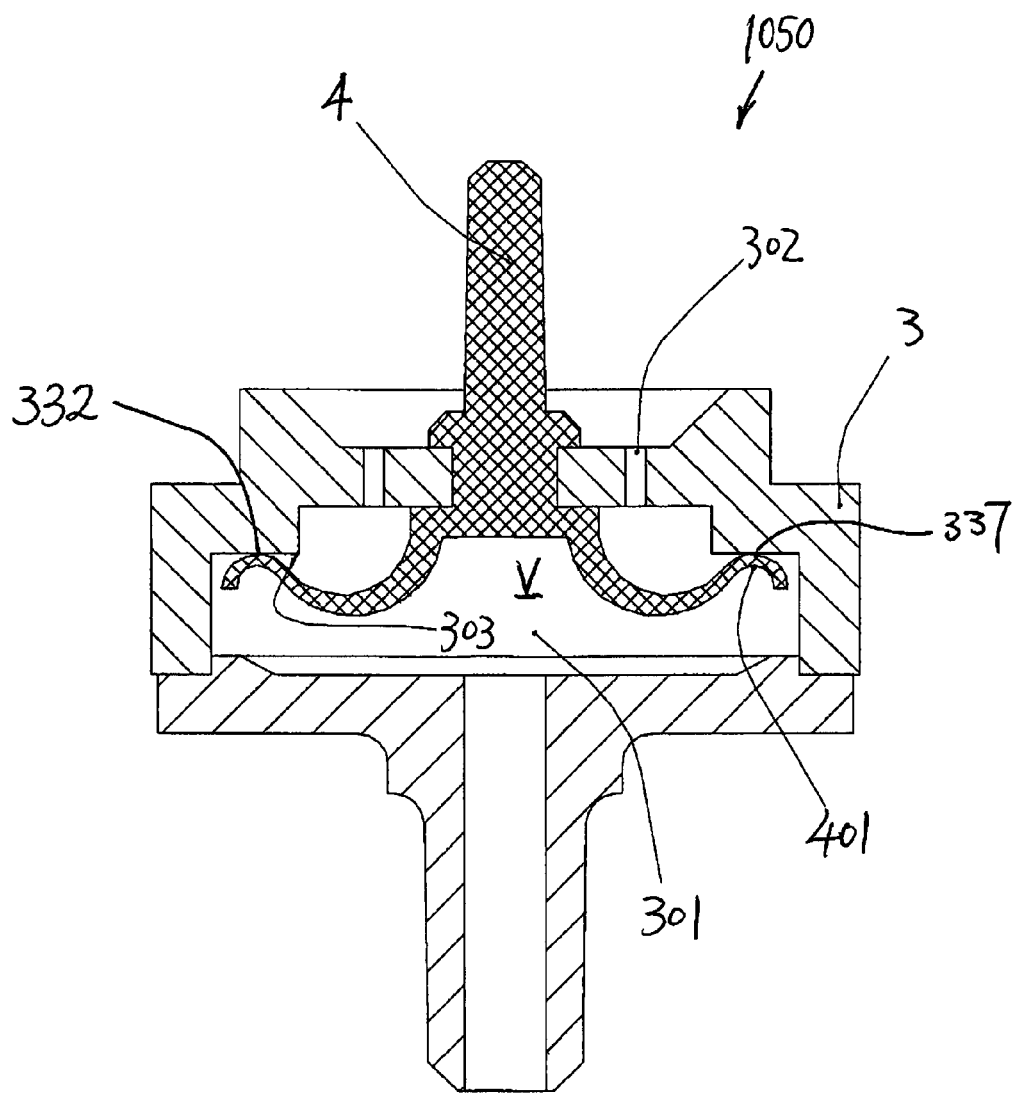
FIG. 7 is a sectional view of a first embodiment of a valve assembly of an ink cartridge.
Figure 8:
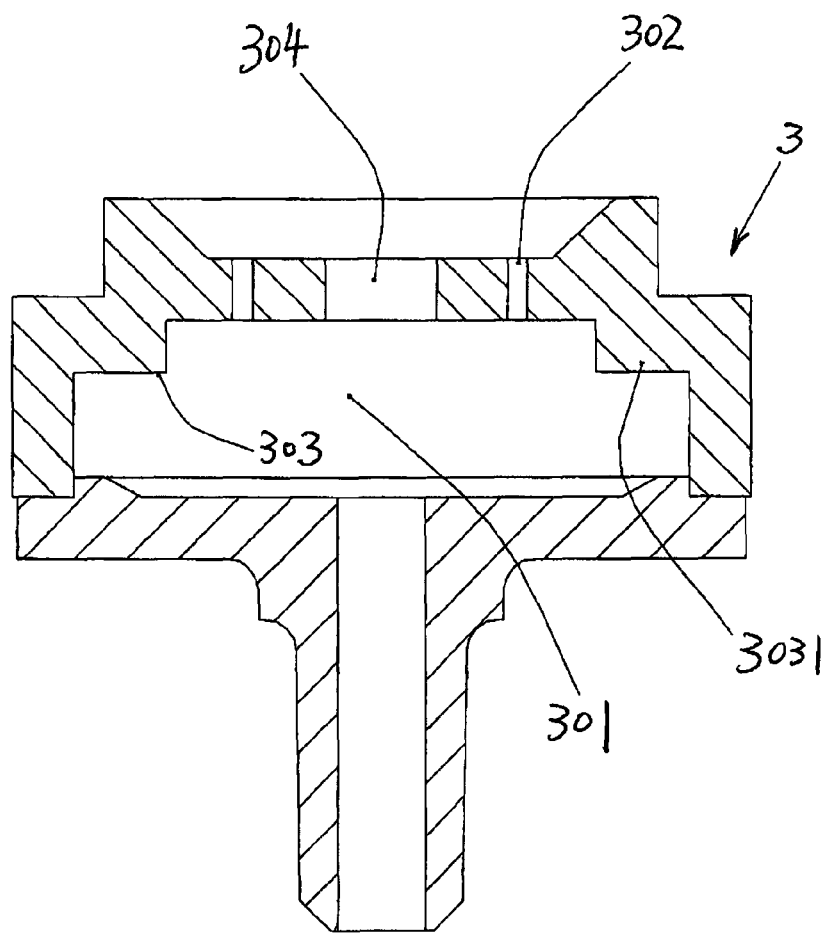
FIG. 8 is a sectional view of a valve seat of the valve assembly of FIG. 7.

FIG. 7 shows a first embodiment of a valve assembly 1050 of an ink cartridge, and FIG. 8 shows a valve seat of the valve assembly 1050 of FIG. 7.

The valve assembly 1050 includes a valve seat 3 and a valve core 4 positioned in the valve seat 3. The valve seat 3 includes a valve chamber 301 defined by the side walls of the valve seat 3. One or more through holes 302 are provided on a side wall of the valve chamber 301, so that the valve chamber 301 can be in fluid communication with an ink supply chamber. The valve core 4 in this embodiment has the same structure as the first valve core 1000 in FIGS. 1a-1c. The valve core 4 has a valve sheet. The valve core 4 may includes a valve stem, which can be hermetically fixed in the valve stem opening 304, such that the valve stem extension extends outwards from the valve seat 3 and the valve sheet is disposed inside the valve chamber 301. Due to the difference in pressure between the interior "V" and the exterior of the valve chamber 301, the curved surface 332 of the outer portion 401 of the valve sheet may either sealingly engage with the inner surface 303 of the valve chamber 301 so as to block the through holes 302, or disengage by deflecting away from the inner surface 303 of the valve chamber 301 so as to open the through holes 302. In the illustrated embodiment, the curved surface 332 of the outer portion 401 sealingly engages with the inner surface 303 in a tangent relationship. The protruding end 337 of the outer portion 401 is served as a sealing region to engage with the inner surface 303.

Figure 9:
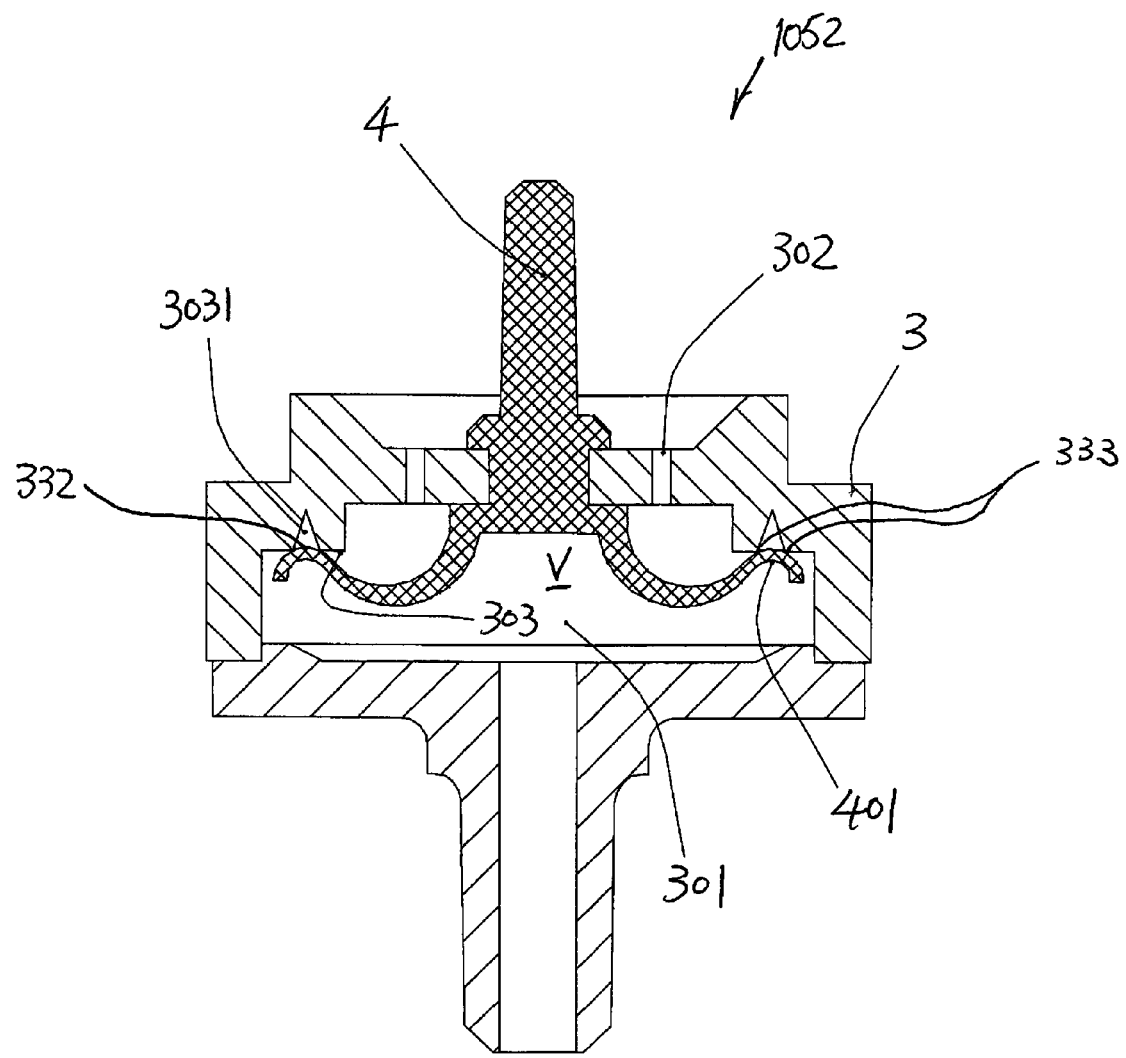
FIG. 9 is a sectional view of a second embodiment of a valve assembly of an ink cartridge.
Figure 10A:
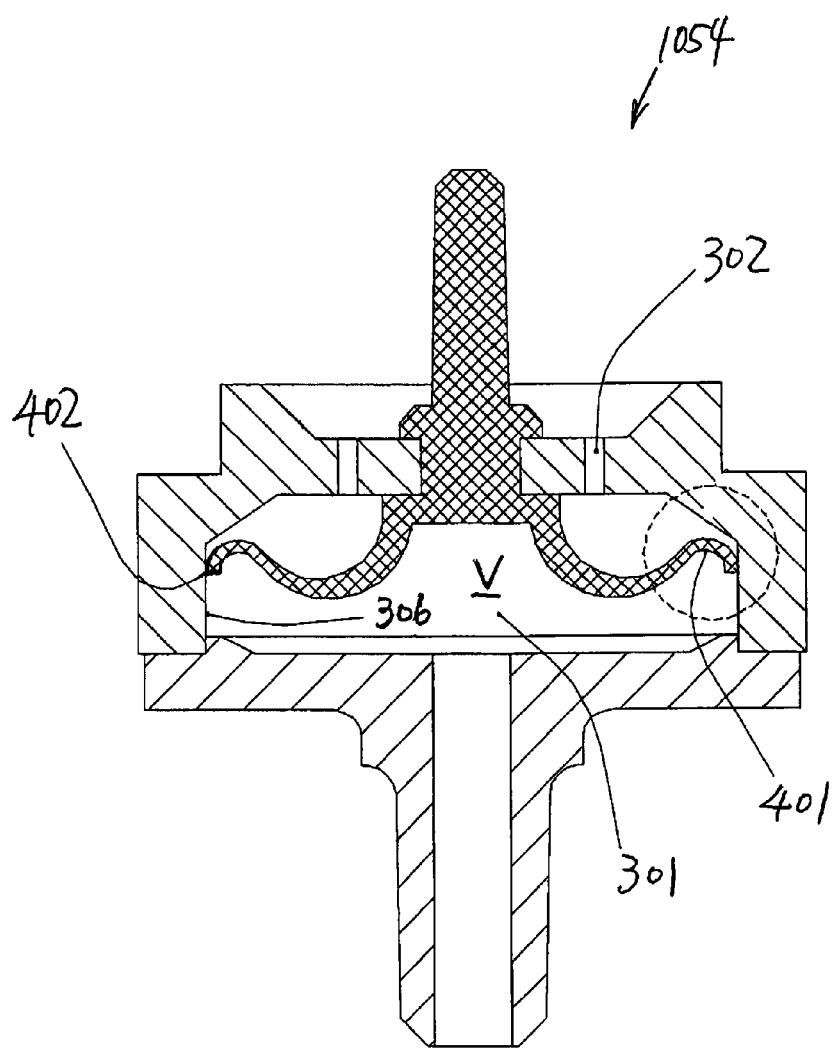
FIG. 10a is a sectional view of a third embodiment of a valve assembly of an ink cartridge.
Figure 10B:
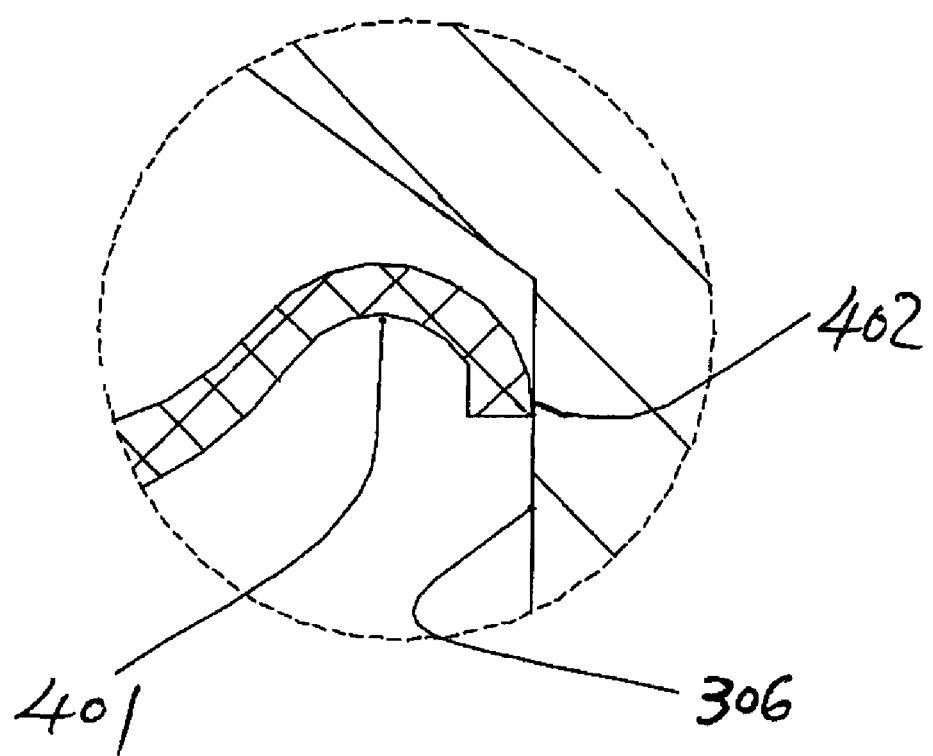
Figure 10C:
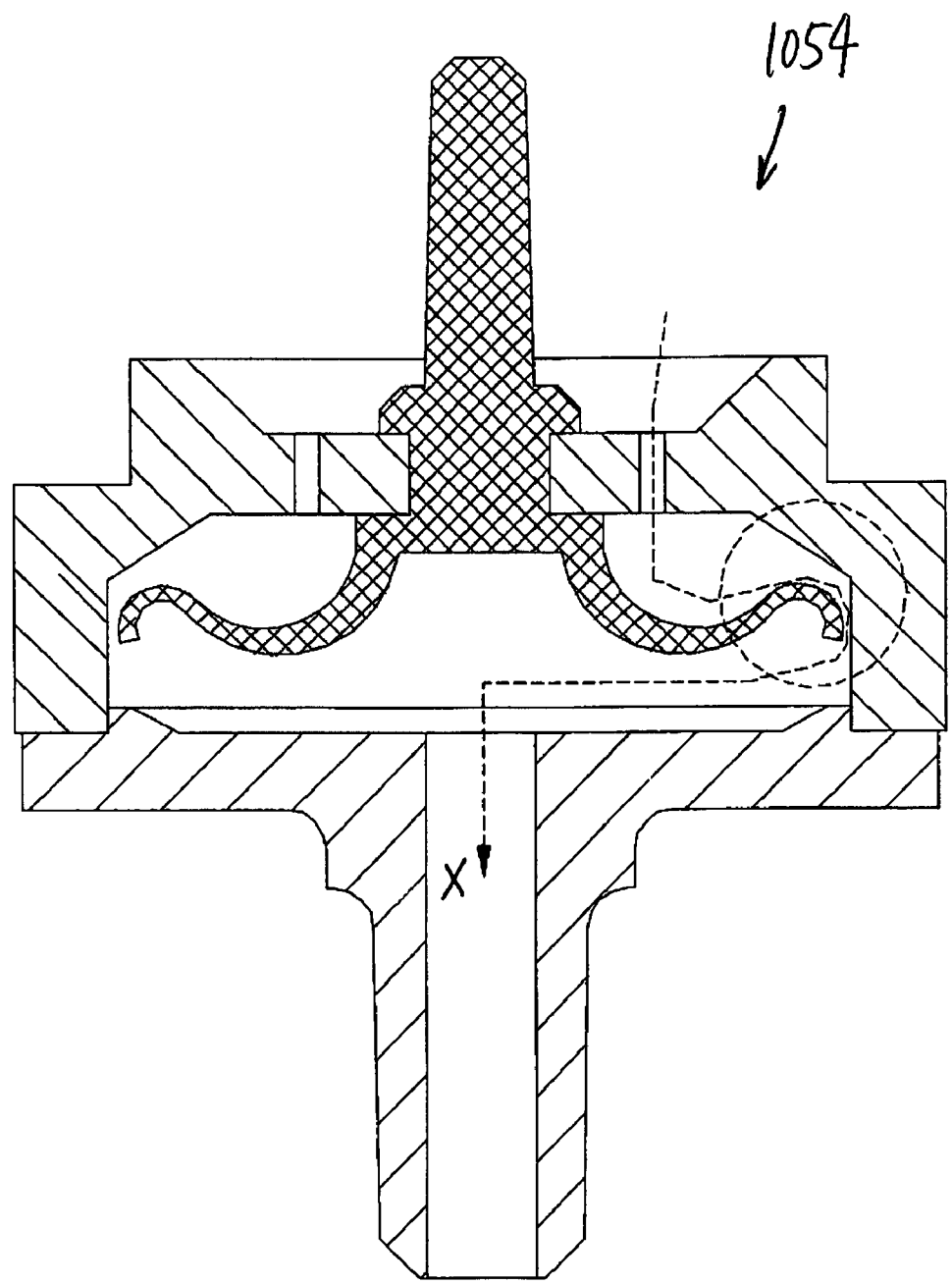
FIG. 10c is a sectional view of the valve assembly of FIG. 10a showing the flow of the ink.
Figure 10D:
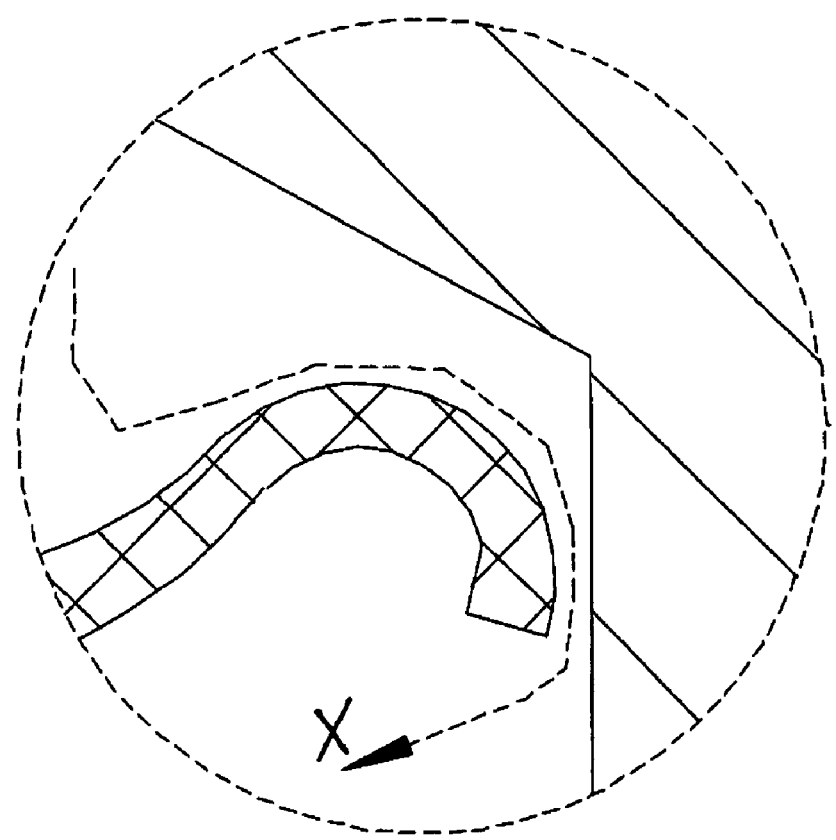
FIG. 10d is a partial enlarged sectional view of FIG. 10c.

FIG. 9 shows the second embodiment of a valve assembly 1052 of an ink cartridge.

The second valve assembly 1052 is formed by adding a groove 3031 in the valve seat 3 at a position where curved surface 332 of the outer portion 401 of the valve sheet can sealingly engage with edges 333 of the groove 3031. In the illustrated embodiment, the groove is annular and its cross section is triangular in shape. The groove 3031 may be of other appropriate shapes.

Due to the difference in pressure between the interior "V" and the exterior of the valve chamber 301, the curved surface 332 of the outer portion 401 of the valve sheet may either sealingly engage with the edges 333 of the groove 3031 so as to block the through holes 302, or disengage by deflecting away from the edges 333 of the groove 3031 so as to open the through holes 302.

FIGS. 10a, 10b 10c and 10d show the third embodiment of a valve assembly 1054 of an ink cartridge.

The main structures of the third valve assembly 1054 are the same as those of the second valve assembly 1052. Due to the difference in pressure between the interior "V" and the exterior of the valve chamber 301, the out end 402 of the valve sheet can sealingly engage with the inner surface 306 of the valve chamber 301. The engagement blocks the through holes 302 and the valve chamber 301. Conversely, due to the change in pressure between the interior "V" and the exterior of the valve chamber 301, the outer portion 401 of the valve sheet can deflect away from the inner surfaces 306 to open the through holes 302, forming an ink flow passage shown by the dash line and arrow X in FIGS. 10c and 10d.

Figure 11:
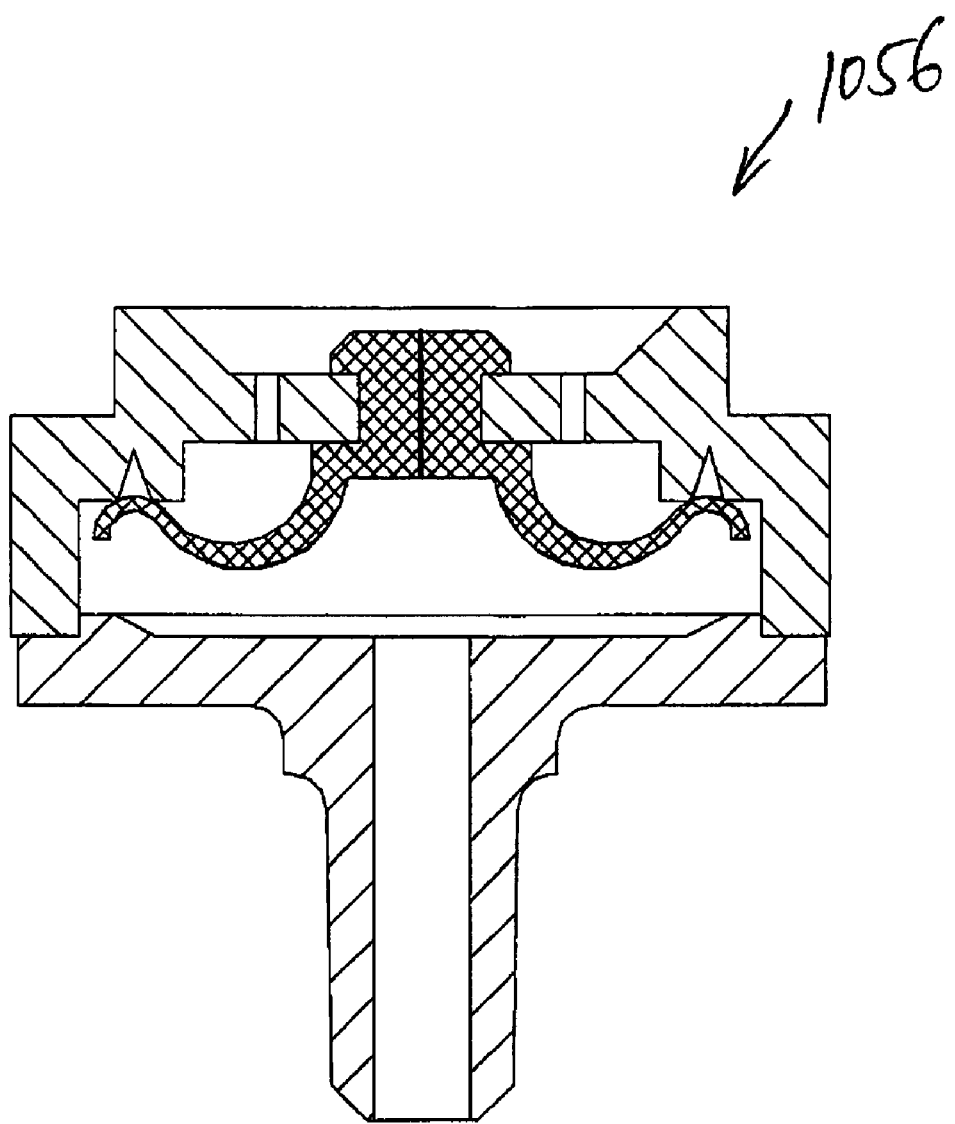
FIG. 11 is a sectional view of a fourth embodiment of a valve assembly of an ink cartridge.
Figure 12:
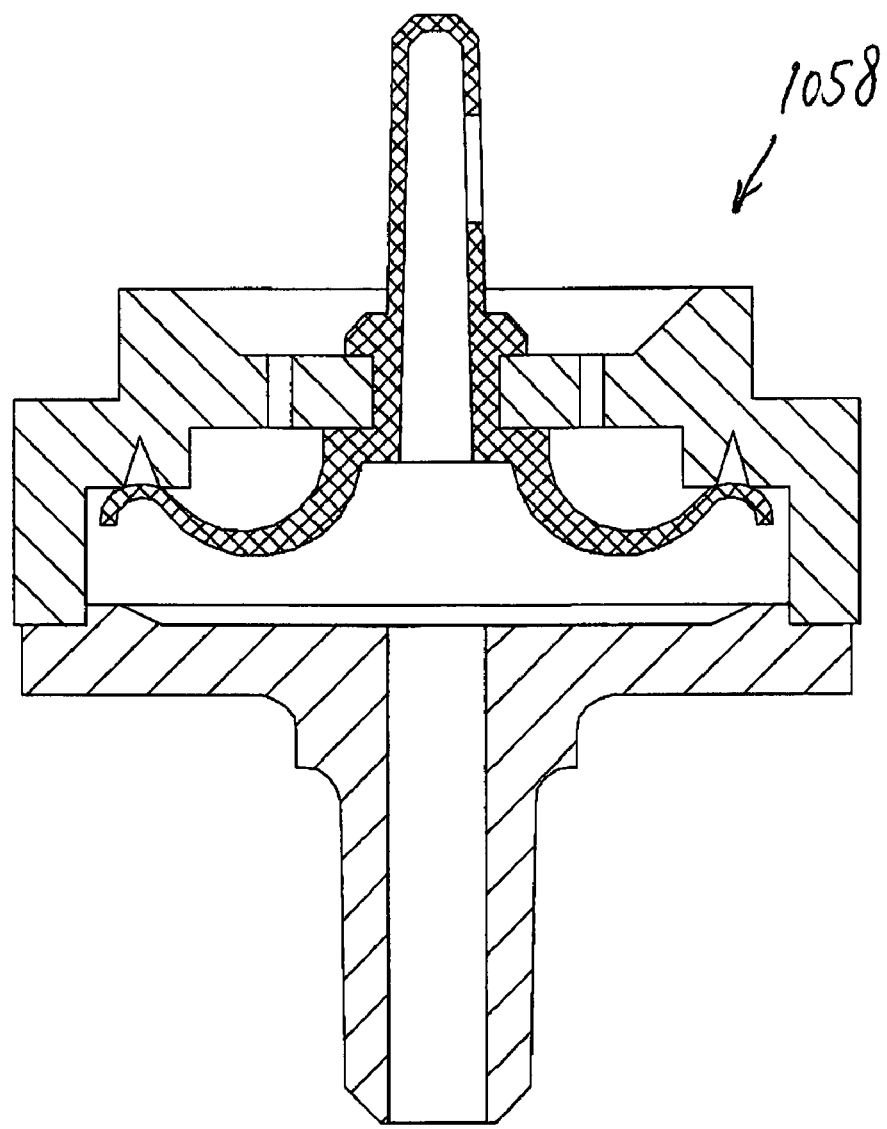
FIG. 12 is a sectional view of a fifth embodiment of a valve assembly of an ink cartridge.
Figure 13:
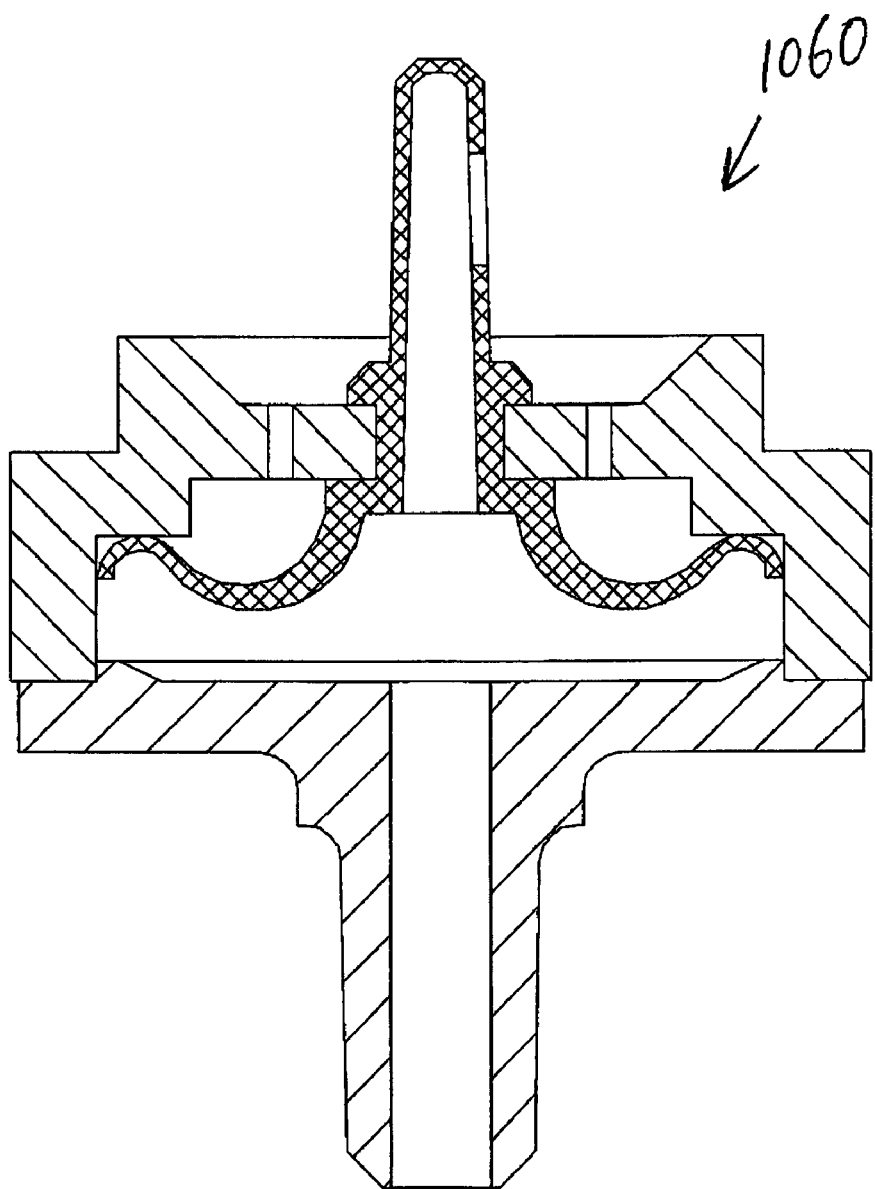
FIG. 13 is a sectional view of a sixth embodiment of a valve assembly of an ink cartridge.

Other valve assembly embodiments may be formed by employing the valve cores and the valve assemblies described above. For example, the fourth valve assembly 1056 showed in FIG. 11 may be formed by combining the fifth valve core 1008 in FIG. 5 with the valve seat of the second valve assembly 1052. The valve seats of the first and the second valve assemblies 1050, 1052 may combine with the sixth valve core 1010 of different dimensions so as to form the fifth and the sixth valve assemblies 1058, 1060 as shown in FIGS. 12 and 13, respectively. The operating principles of the fifth and sixth valve assemblies 1058, 1060 are similar to those of the first and the second valve assemblies 1052, 1050. The valve core can meet the decompression requirement of decrease in the effective ink volume due to the insert of the ink supply needle to the ink supply port.

Figure 14:
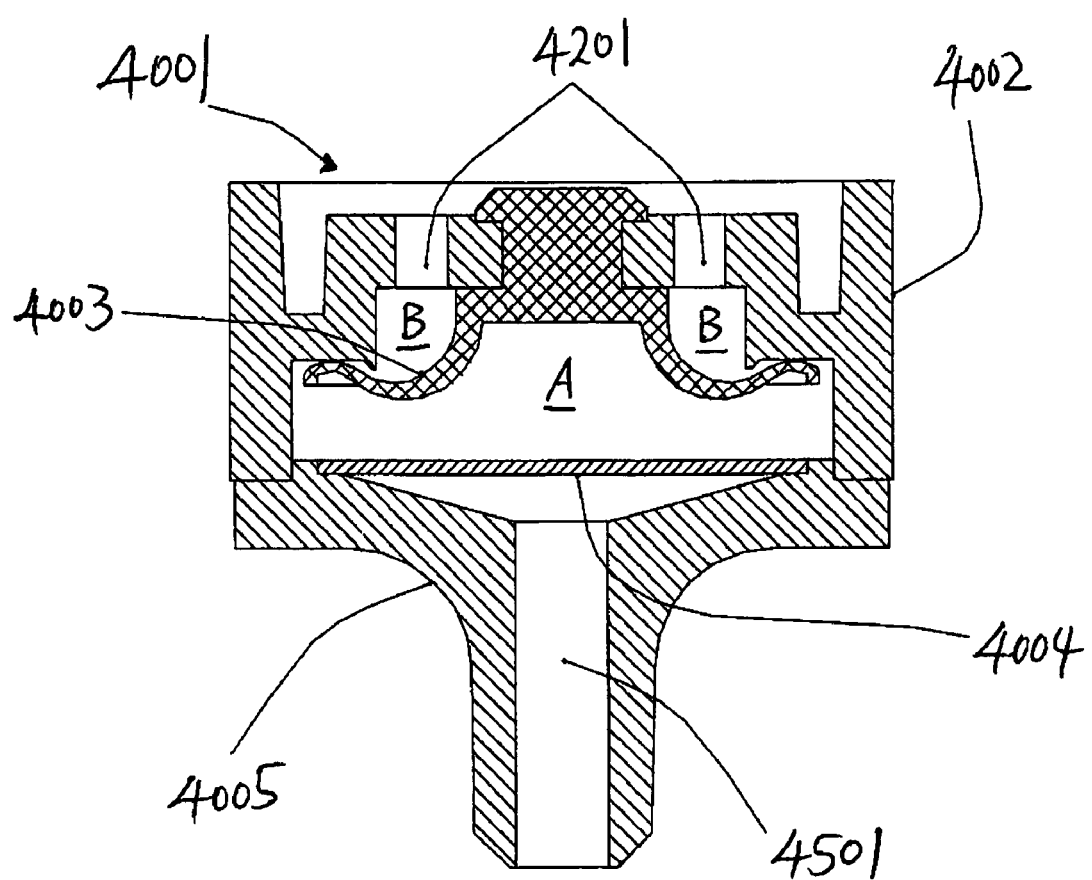
FIG. 14 is a sectional view of a further embodiment of a valve assembly of an ink cartridge.

FIG. 14 shows a further embodiment of a valve assembly 4001 of an ink cartridge.

The valve assembly 4001 includes a valve seat 4002, a valve core 4003, a filter 4004 and a valve cover 4005. The valve cover 4005 closely covers the valve seat 4002 forming a valve chamber. The valve core 4003 is disposed inside the valve chamber. The valve core 4003 divides the valve chamber of the valve assembly into a first chamber "A" and a second chamber "B" which are separate from each other. The filter 4004 is disposed inside the first chamber "A".

Figure 15:
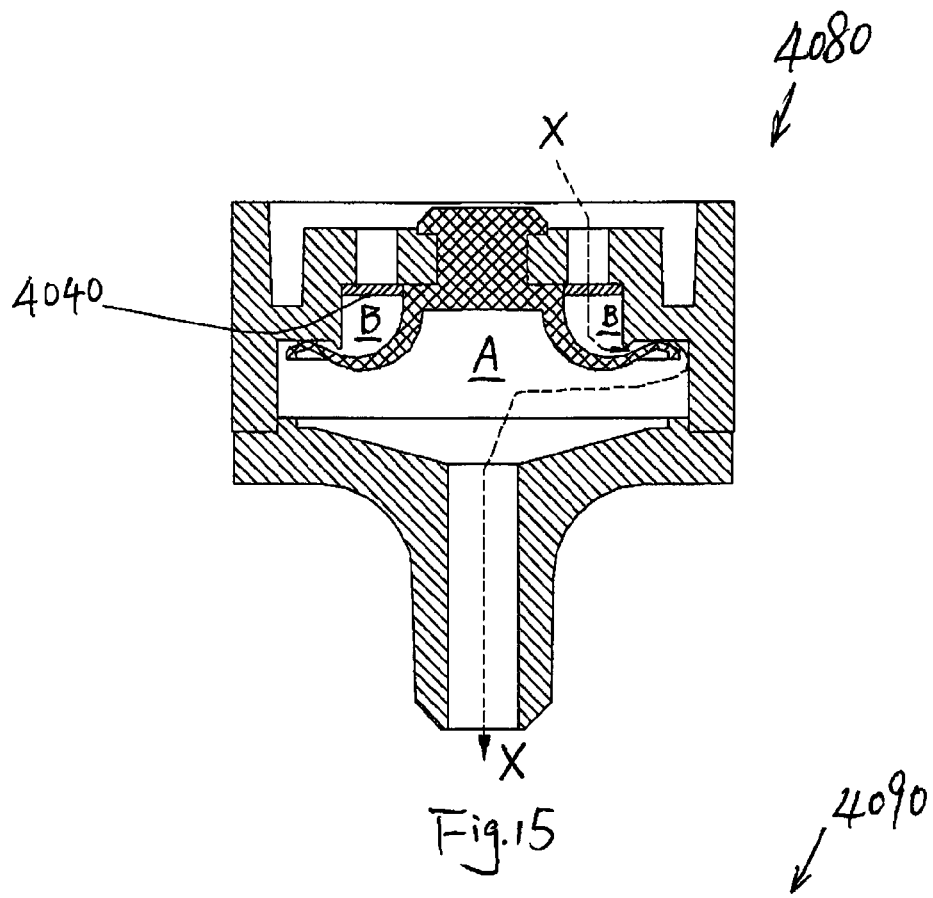
FIG. 15 is a sectional view of another embodiment of a valve assembly of an ink cartridge.
Figure 16:
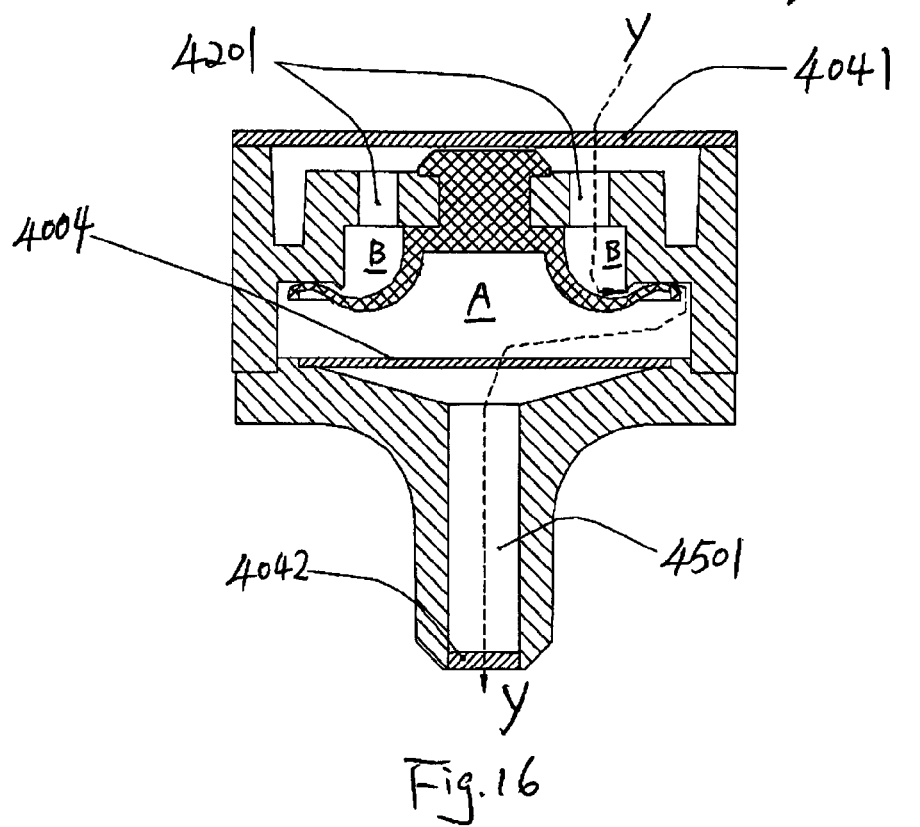
FIG. 16 is a sectional view of yet another embodiment of a valve assembly of an ink cartridge.

FIGS. 15 and 16 show two further embodiments of valve assemblies 4080 and 4090 of ink cartridges, respectively.

The main structures of the valve assemblies 4080 and 4090 in FIGS. 15 and 16 are the same as those of the valve assembly 4001 in FIG. 14, such as the shape of the valve seat, the valve core and the valve cover, as well as their assembly relationship.

The difference is that a filter 4040 of the valve assembly 4080 in FIG. 15 is disposed inside the second chamber "B". When the pressure in the ink storage chamber is higher than the pressure in the valve chamber of the valve assembly 4080, the ink flows along the dash line in the direction shown by arrow X, through the filter 4040, and eventually into the ink supply port.

Compared with the valve assemblies 4001 and 4080 in FIGS. 14 and 15, the valve assembly 4090 in FIG. 16 retains the filter 4004. In addition, a second filter 4042 and a third filter 4041 are utilized. The second filter is positioned at the port of the first ink passage 4501 which faces the ink supply port. The third filter 4041 is positioned at the port of the second ink passage 4201 which faces the ink storage chamber. When the pressure in the ink storage chamber is higher than the pressure in the valve chamber of the valve assembly 4090, the ink flows along the dash line in the direction shown by arrow Y, through the filters 4041, 4004 and 4042, and eventually into the ink supply port.

It is understood by one skilled in the art that the filter is optional. It is also understood by one skilled in the art that one or more filters can be positioned at downstream and/or upstream sides of the valve assembly.

Figure 31A:
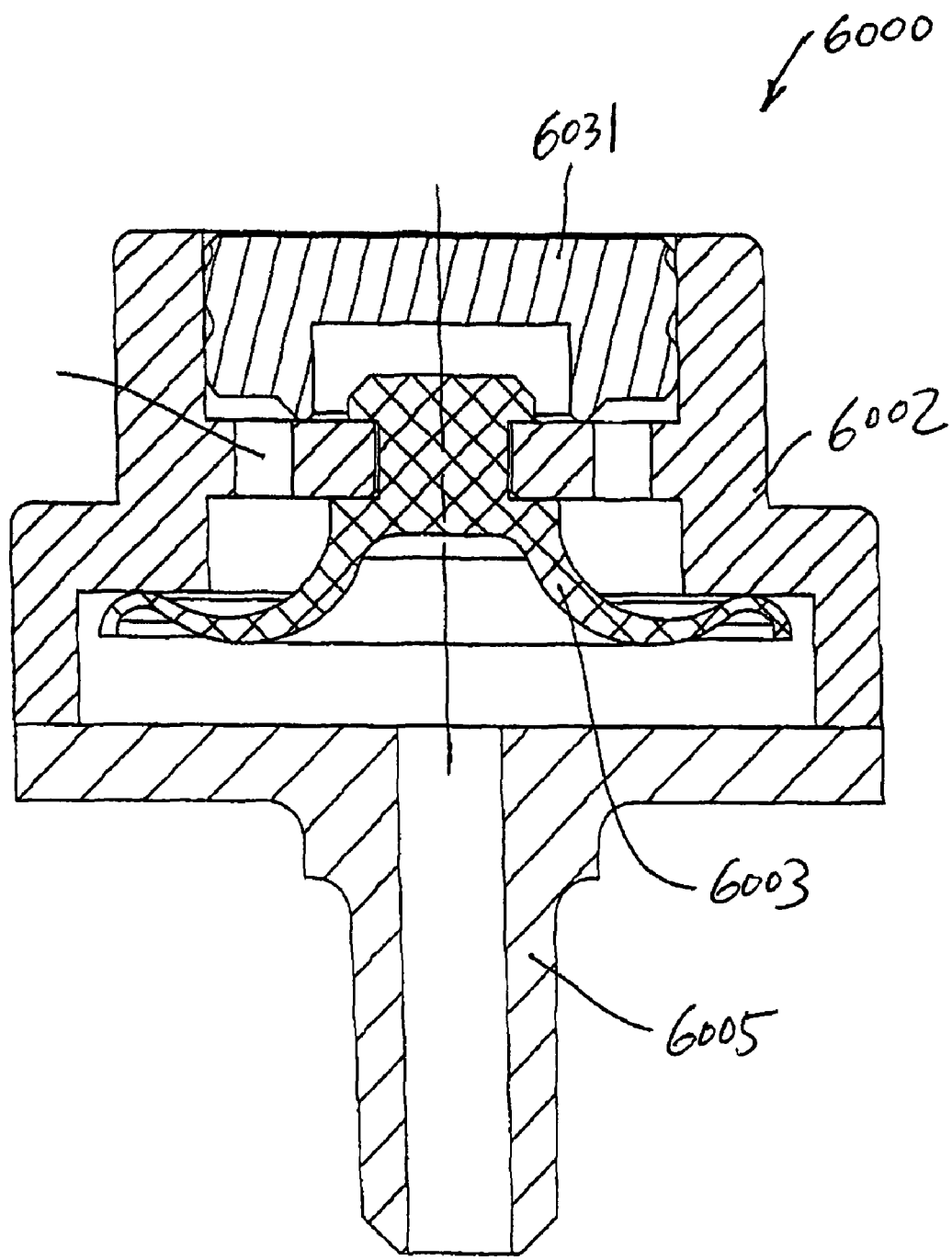
FIG. 31a is a sectional view of a further embodiment of a valve assembly of an ink cartridge.
Figure 31:
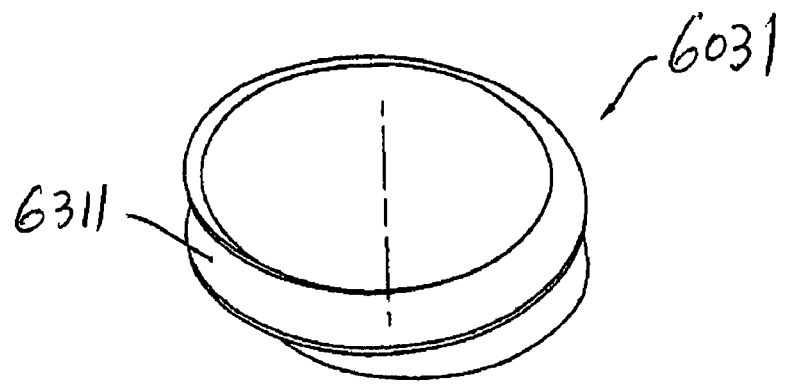

FIG. 31a shows another embodiment of a valve assembly 6000 of an ink cartridge.

The valve assembly 6000 includes a valve seat 6002, a valve core 6003 and a valve cover 6005. The valve cover 6005 closely covers the valve seat 6002 forming a valve chamber. The valve core 6003 is disposed inside the valve chamber. A buffering member 6031 is provided at the upstream side of the valve assembly 6000. The buffering member 6031 as shown in FIG. 31b has a passage 6311 provided on its circumference. In the illustrated embodiment, the passage 6311 is a form of a screw thread. One end of the screw thread is on the upper surface of the buffering member 6031, and the other end of the screw thread is on the lower surface of the buffering member 6031. With the buffering member 6031, the impact of the ink on the valve sheet 6003 is reduced when the ink enters into the valve chamber from the ink supple chamber.

Figure 32:
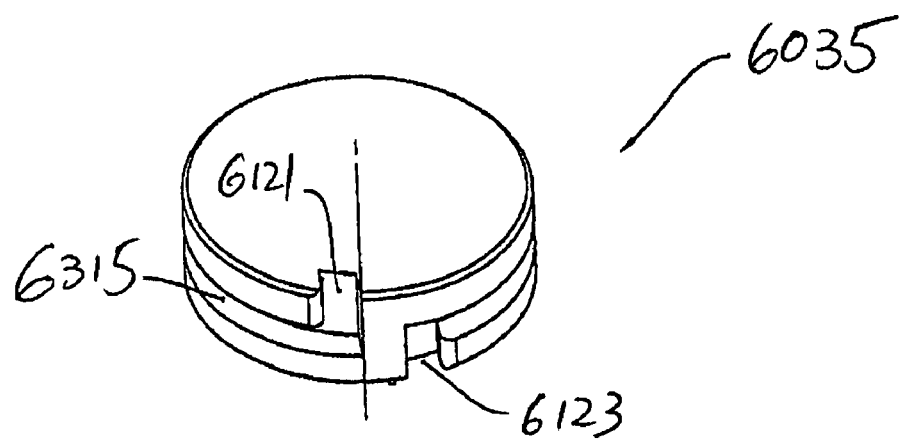
FIG. 32 is a perspective view of another embodiment of a buffering member.

FIG. 32 shows another embodiment of a buffering member 6035. The buffering member 6035 has a groove 6315 provided on its circumference. An inlet 6121 and an outlet 6123 are provided on the upper surface and the lower surface of the buffering member 6035, respectively. The inlet 6121 is associated with one end of the groove 6315, and the outlet 6123 is associated with the other end of the groove 6315. With the buffering member 6035, the impact of the ink on the valve sheet is reduced when the ink enters into the valve chamber from the ink supple chamber.

Figure 33:
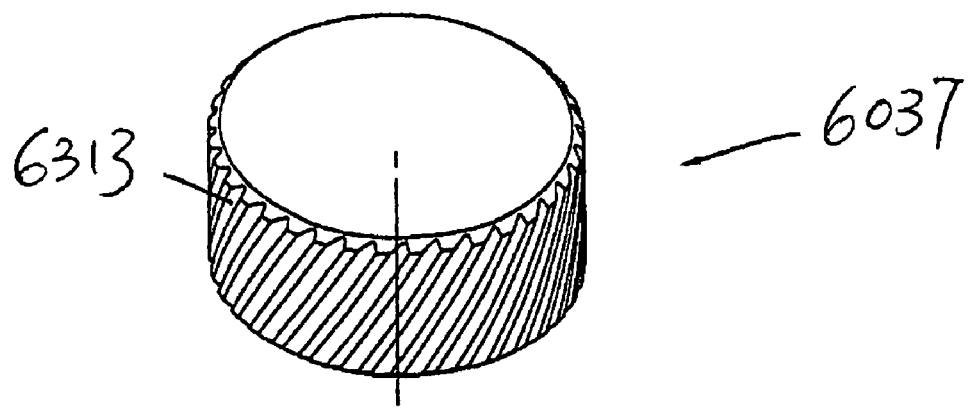
FIG. 33 is a perspective view of yet another embodiment of a buffering member.

FIG. 33 shows another embodiment of a buffering member 6037. The buffering member 6037 has a plurality of inclined flumes 6313 on its circumference, extending from the upper surface to the lower surface of the buffering member 6037. With the buffering member 6037, the impact of the ink on the valve sheet is reduced when the ink enters into the valve chamber from the ink supple chamber.

Figure 34:
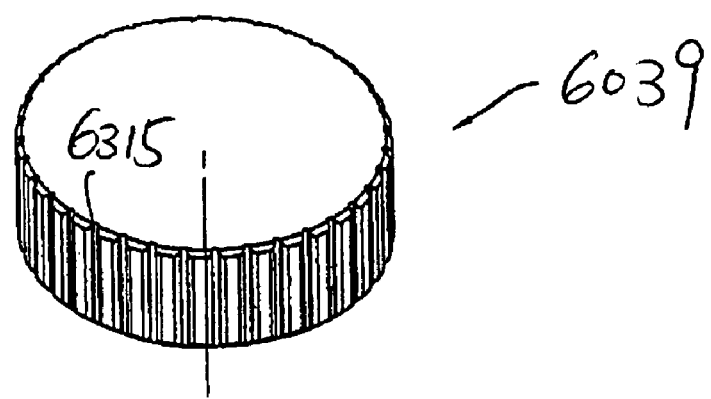
FIG. 34 is a perspective view of yet another embodiment of a buffering member.

FIG. 34 shows another embodiment of a buffering member 6039. The buffering member 6039 has a plurality of vertical flumes 6315 on its circumference, extending from the upper surface to the lower surface of the buffering member 6039. With the buffering member 6039, the impact of the ink on the valve sheet is reduced when the ink enters into the valve chamber from the ink supple chamber.

It is understood by one skilled in the art that the buffering member can be other shapes which are utilized to reduce the impact of the ink on the valve sheet when the ink enters into the valve chamber from the ink supple chamber.

Figure 17A:
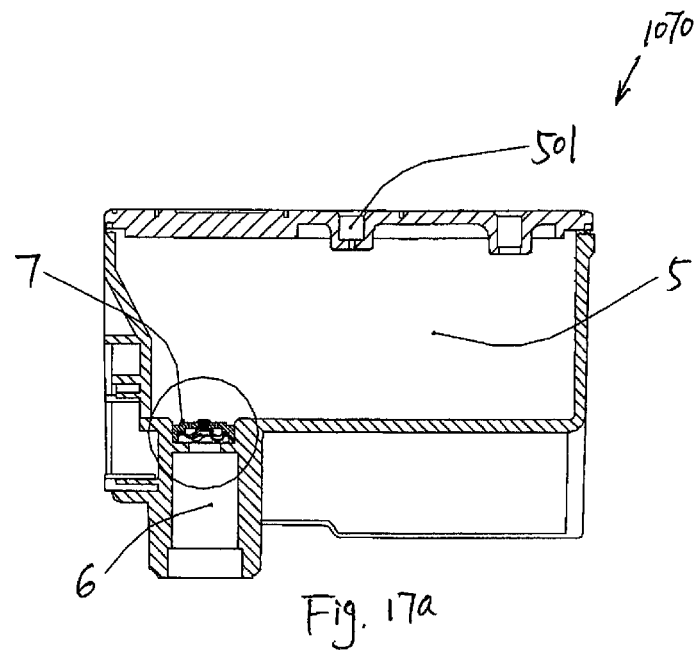
FIG. 17a is a sectional view of a first embodiment of an ink cartridge.
Figure 17B:
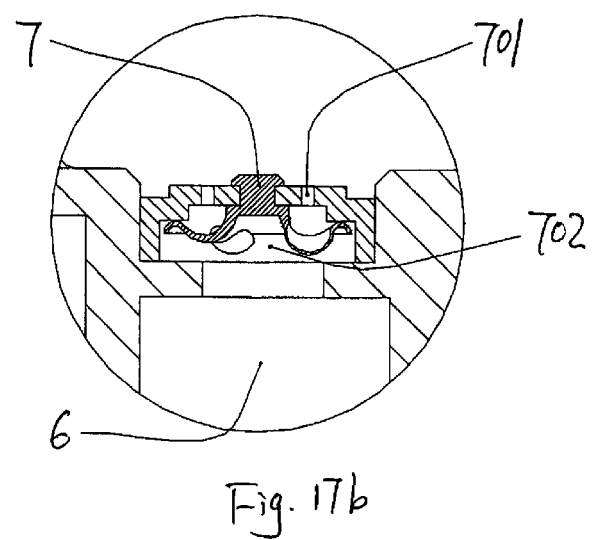

FIGS. 17a and 17b show a first embodiment of an ink cartridge 1070.

The ink cartridge 1070 for an inkjet printer includes an ink storage chamber 5 adapted to contain ink, an ink supply port 6 adapted to supply ink to a print head of a inkjet printer, and a valve assembly 7 positioned between the ink storage chamber 5 and the ink supply port 6, and adapted to open or close the through holes or ink passages between the ink storage chamber 5 and the ink supply port 6. The valve assembly 7 includes a valve seat and a valve core positioned in the valve seat, which have been described in detail hereinbefore. In the illustrated embodiment, the ink storage chamber 5 communicates with the atmosphere through an air opening 501. The valve assembly 7 controls the flow of ink between the ink storage chamber 5 and the ink supply port 6. Depending on the difference in pressure between the ink storage chamber 5 and the ink supply port 6, the outer portion of the valve sheet may be sealingly engage or disengage with the inner surfaces of the valve chamber so as to block or open the through holes 701 and the valve chamber 702 shown in FIG. 17*b*.

Figure 18A:
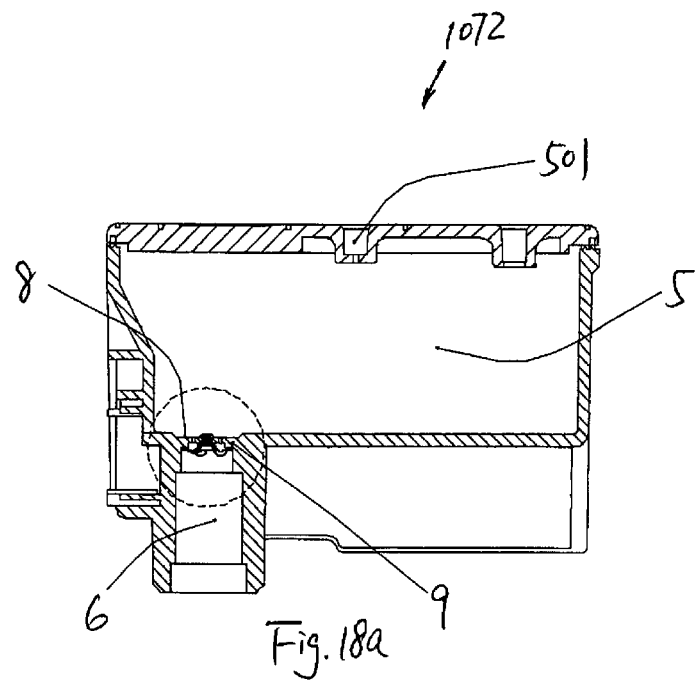
FIG. 18a is a sectional view of a second embodiment of an ink cartridge.
Figure 18B:
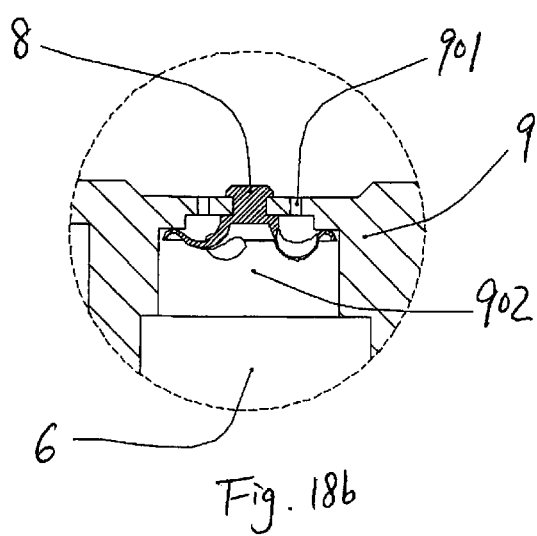

FIGS. 18*a* and 18*b* show a second embodiment of an ink cartridge 1072.

The main structures of this embodiment are the same as those of the first ink cartridge 1070. The difference is that a valve seat 9 may be integrally formed on the wall of the ink cartridge body between the ink storage chamber 5 and the ink supply port 6. Both the valve chamber 902 for containing the valve core 8 and the through holes 901 are provided in the valve seat 9. The second ink cartridge 1072 can be obtained by assembling the valve core 8 inside the valve chamber 902.

Figure 19:
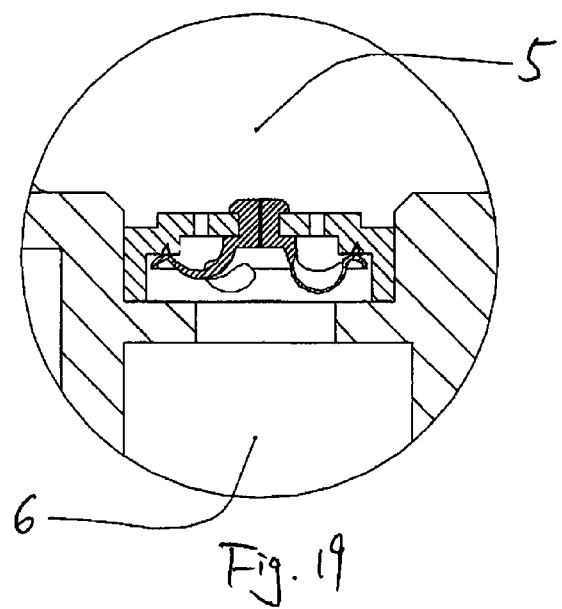
FIG. 19 is a partial enlarged sectional view of a third embodiment of an ink cartridge.
Figure 20:
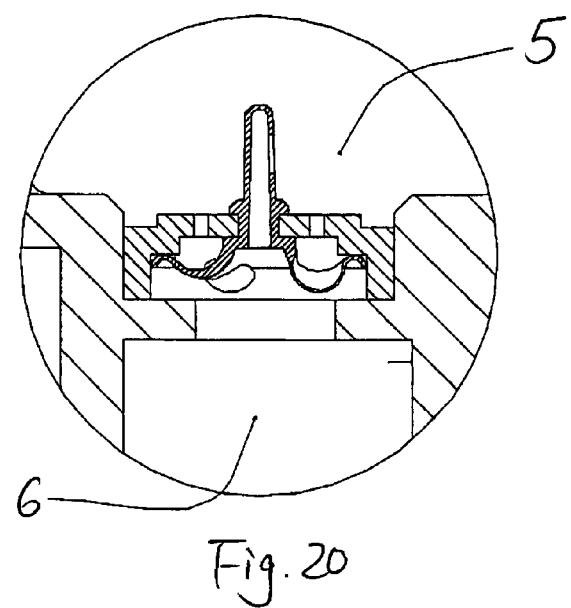
FIG. 20 is a partial enlarged sectional view of a fourth embodiment of an ink cartridge.

FIGS. 19 and 20 show a third and forth embodiments of ink cartridges, respectively.

The main structures of both the third and forth ink cartridges are the same as those of the first ink cartridge embodiment 1070. Referring to the enlarged views of the valve assembly between the ink storage chamber 5 and the ink supply port 6 shown in FIGS. 19 and 20, the third and forth ink cartridges are obtained by employing the valve assemblies 1056, 1060, respectively.

Figures 21, 22:
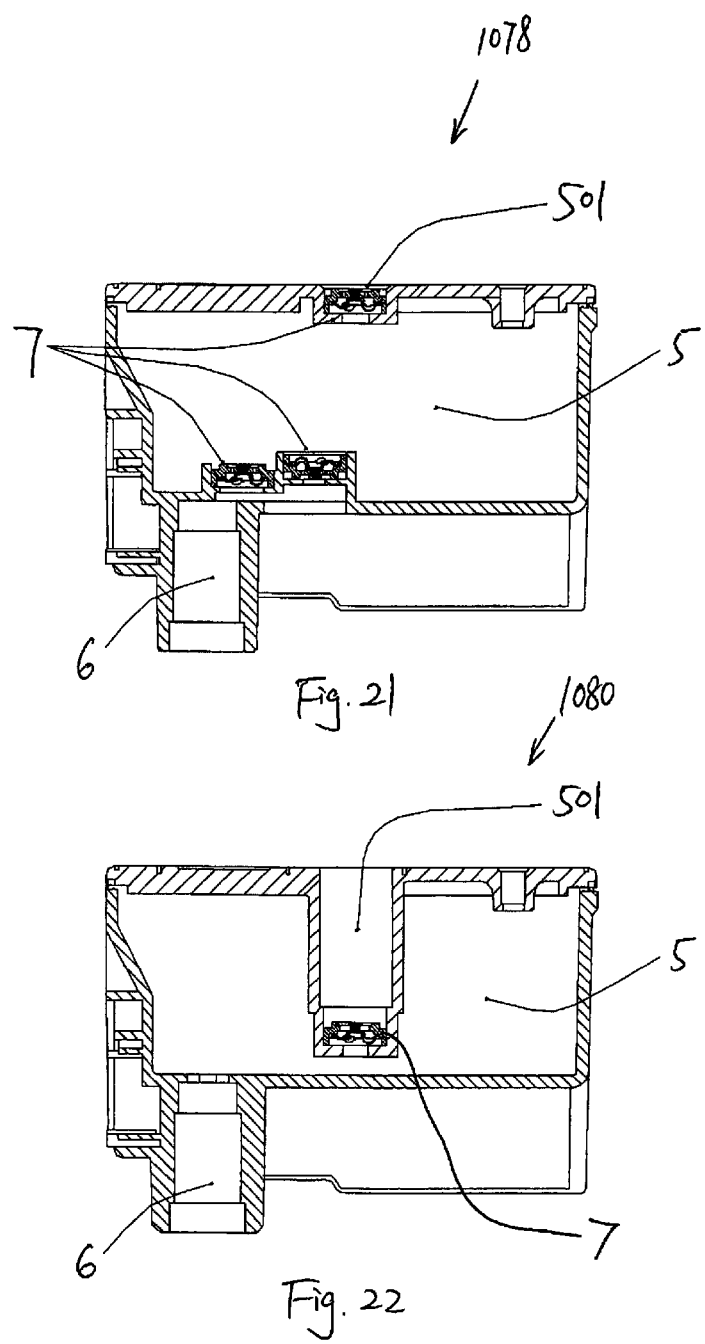
FIG. 21 is a sectional view of a fifth embodiment of an ink cartridge.
FIG. 22 is a sectional view of a sixth embodiment of an ink cartridge.

FIG. 21 shows a fifth embodiment of an ink cartridge 1078.

The fifth ink cartridge 1078 employs three valve assemblies 7. Two valve assemblies 7 may be disposed between the ink storage chamber 5 and the ink supply port 6. The orientations of the valve cores of these two valve assemblies are opposite to each other. Therefore, whether the pressure in the ink storage chamber 5 is higher or lower than that in the ink supply port 6, these two valve assemblies may allow the flow of ink in opposite directions. Furthermore, the air opening 501 above the ink storage chamber 5 communicates with the ink storage chamber 5 through the third valve assembly, such that the deference in pressure between the ink storage chamber 5 and the atmosphere can be maintained in a stable condition. It is understood that the third valve assembly is optional to the fifth ink cartridge 1078 and that the third valve assembly can be used with the first, second, third or fourth ink cartridge in FIGS. 17-20.

FIG. 22 shows a sixth embodiment of an ink cartridge 1080.

The main structures of this embodiment are the same as those of the first ink cartridge 1070 in FIG. 17*a*. The difference is that there are no valve assemblies between the ink storage chamber 5 and the ink supply port 6. The air opening 501 extends to the bottom of the ink storage chamber 5 with a valve assembly 7 disposed at the lower position thereof. A stable negative pressure can be maintained in the ink chamber 5 by the adjustment of the valve assembly 7.

Figure 23:
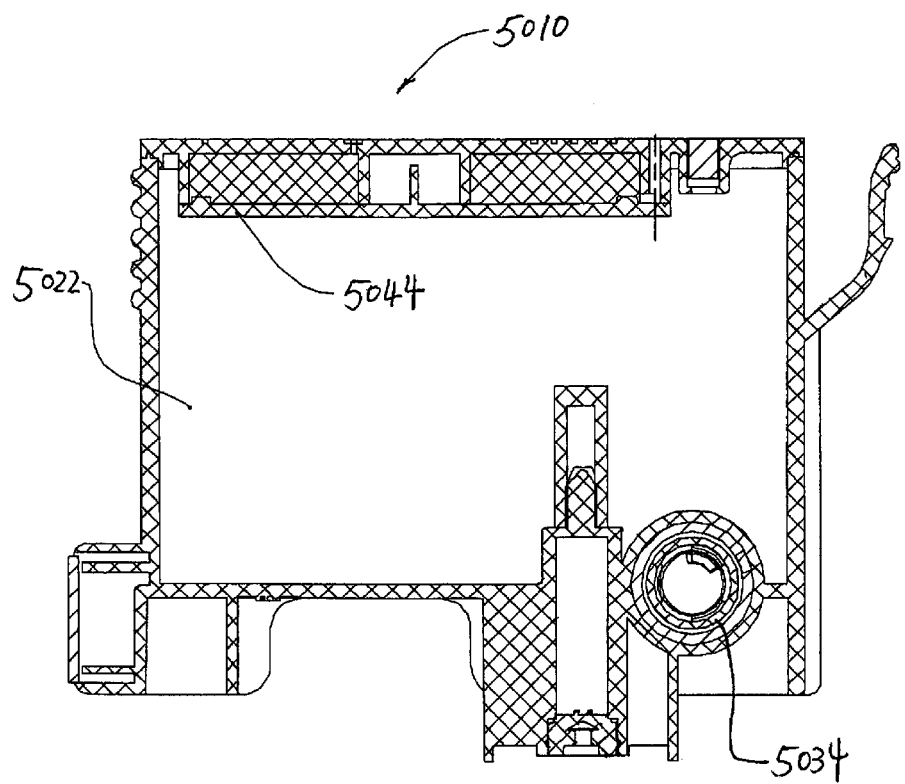
FIG. 23 is a sectional view of a further embodiment of an ink cartridge.

FIG. 23 shows a further embodiment of an ink cartridge 5010. The ink cartridge 5010 includes a cartridge body 5022 for containing ink therein. The lower portion of the cartridge body 5022 provided with one of the valve assemblies 5034 described hereinbefore. The upper portion of the cartridge body 5022 is closed by a cover 5044.

Figure 24:
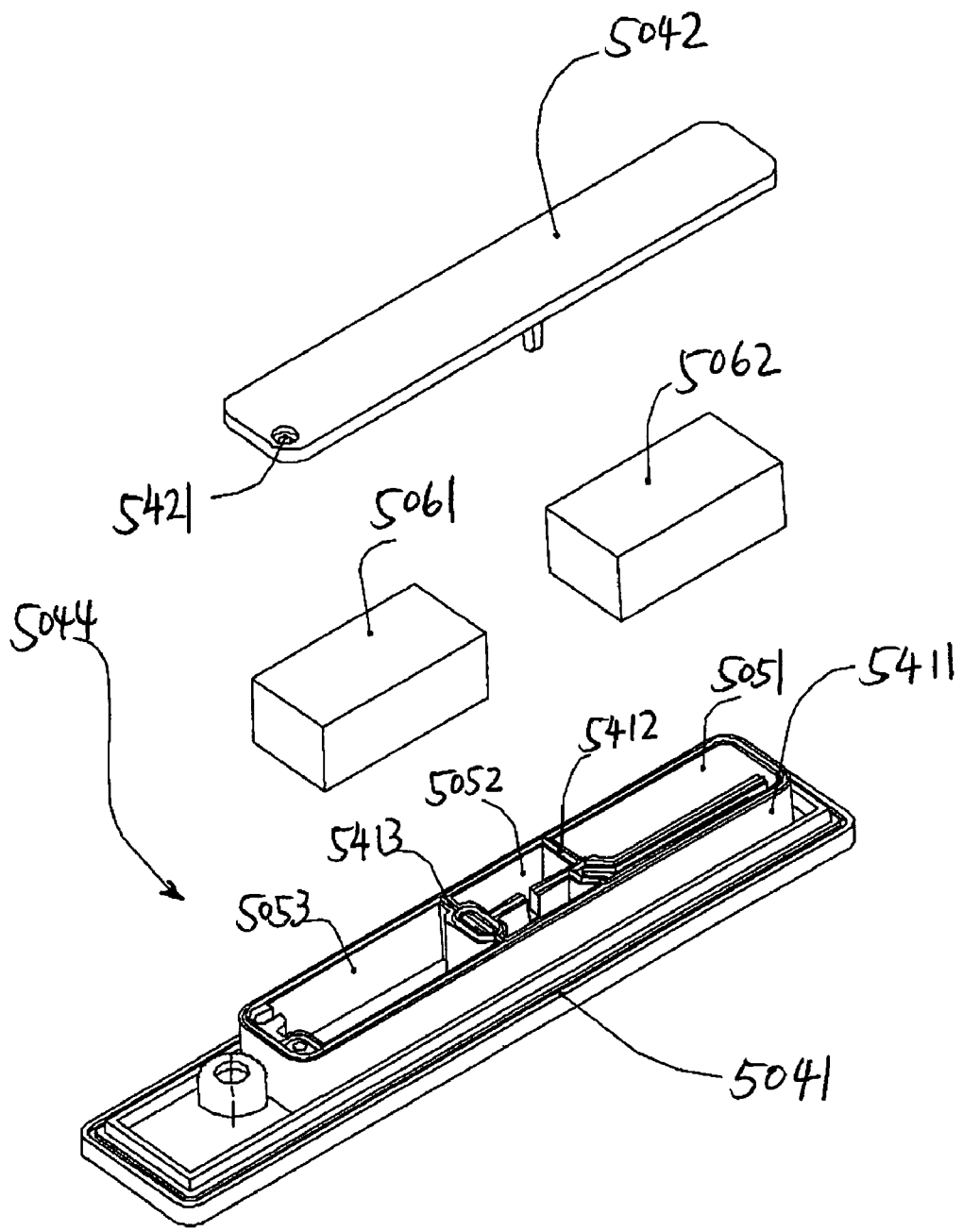
FIG. 24 is an exploded view of a first embodiment of a cover of the ink cartridge of FIG. 23.

FIG. 24 is an exploded view of the cover 5044 of the ink cartridge 5010 of FIG. 23. The cover 5044 includes a thin sheet member 5042 and a cover body 5041 on the lower surface of which a projecting fence 5411 is provided. The space enclosed by the fence 5411 is separated by partition walls 5412 and 5413 into three portions, forming three ink overflow buffer chambers 5051, 5052 and 5053. The ink overflow buffer chambers 5051 and 5053 are adapted to receive ink absorption materials 5061 and 5062, respectively. The thin sheet member 5042 may be attached to or welded on the fence 5411 for sealing the ink overflow buffer chambers 5051, 5052 and 5053. The thin sheet member 5042 may be a sealing membrane, a sheet made of plastic, or other suitable material.

Figure 25:
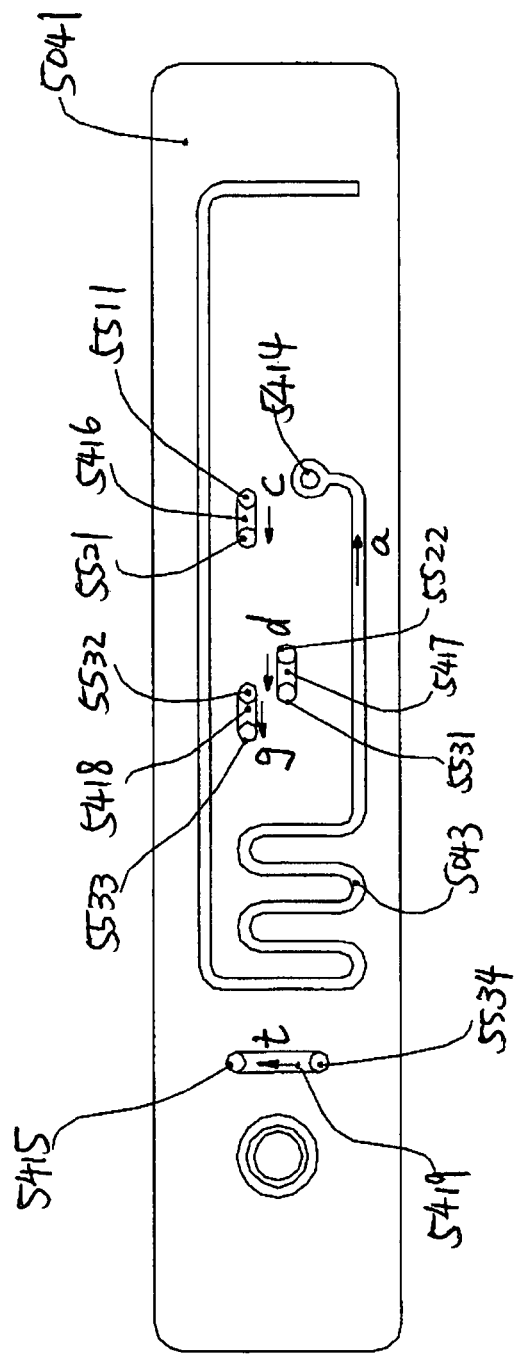
FIG. 25 is a top plan view of the cover of the ink cartridge of FIG. 23.
Figure 26:
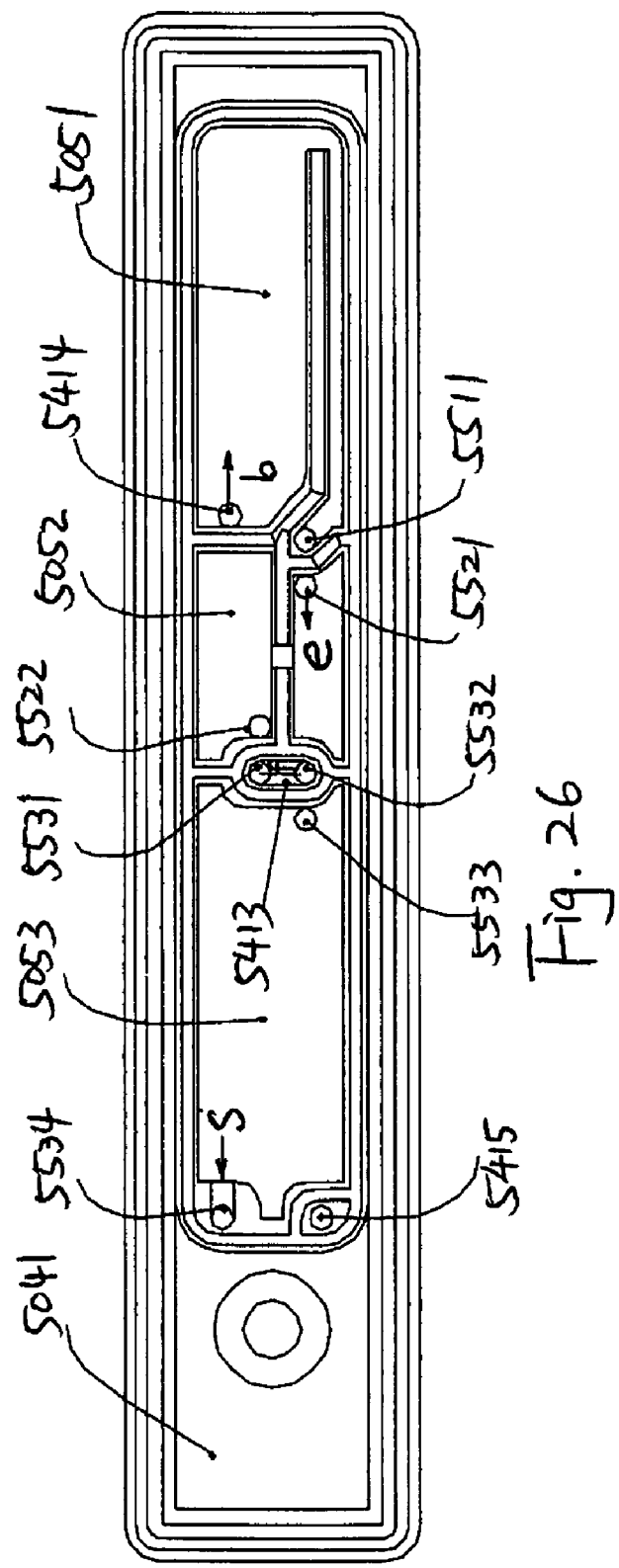
FIG. 26 is a bottom plan view of the cover of the ink cartridge of FIG. 23.

The guiding air direction of the ink cartridge will now be described with reference to FIGS. 25 and 26. Firstly, the air outside the ink cartridge enters the ink overflow buffer chamber 5051 through a serpentine guiding air passage 5043 provided on an upper surface of the cover body 5041 and a first air inlet 5414 along the direction shown by arrow a. Secondly, it enters the ink overflow buffer chamber 5052 through a guiding air opening 5511 in the ink overflow buffer chamber 5051, a concave groove 5416 provided on the surface of the cover body 5041 and a guiding air opening 5521 provided in the ink overflow buffer chamber 5052 along the directions shown by arrows b and c. Thirdly, it enters the ink overflow buffer chamber 5053 through a guiding air opening 5522 provided in the ink overflow buffer chamber 5052, a concave groove 5417 provided on the surface of the cover body 5041, two guiding air openings 5531 and 5532 provided on the partition wall 5413, a concave groove 5418 provided on the surface of the cover body 5041, and a guiding air opening 5533 provided in the ink overflow buffer chamber 5053 along the directions shown by arrows d, e, f and g. Finally, it enters the interior of the ink cartridge 5010 through a guiding air opening 5534 provided in the ink overflow buffer chamber 5053, a concave groove 5419 provided on the surface of the cover body 5041, a second air inlet 5415 provided on the cover body and an opening 5421 provided on the thin sheet member 5042 (FIG. 24) along the directions shown by arrows s and t.

When the ink overflows out of the ink cartridge due to movement or change in the surroundings, the overflowing ink flows in the direction opposite to the above-mentioned guiding air directions, i.e., it first overflows into the ink overflow buffer chamber 5053, and then into the ink overflow buffer chamber 5052, and finally into the ink overflow buffer chamber 5051. All the three openings in the three ink overflow buffer chambers 5051, 5052, 5053 are in fluid communication with each other by means of the concave grooves provided on the surface of the cover body 5041. Therefore, only when one of the ink overflow buffer chambers is filled with ink, the ink overflows into the other ink overflow buffer chambers, such that the space of the ink overflow buffer chambers can be taken full advantage of and the leakage of the ink can be effectively prevented.

Furthermore, the ink absorption materials provided inside the ink overflow buffer chambers 5051 and 5053 can absorb the ink and prevent it from leaking.

Figure 27:
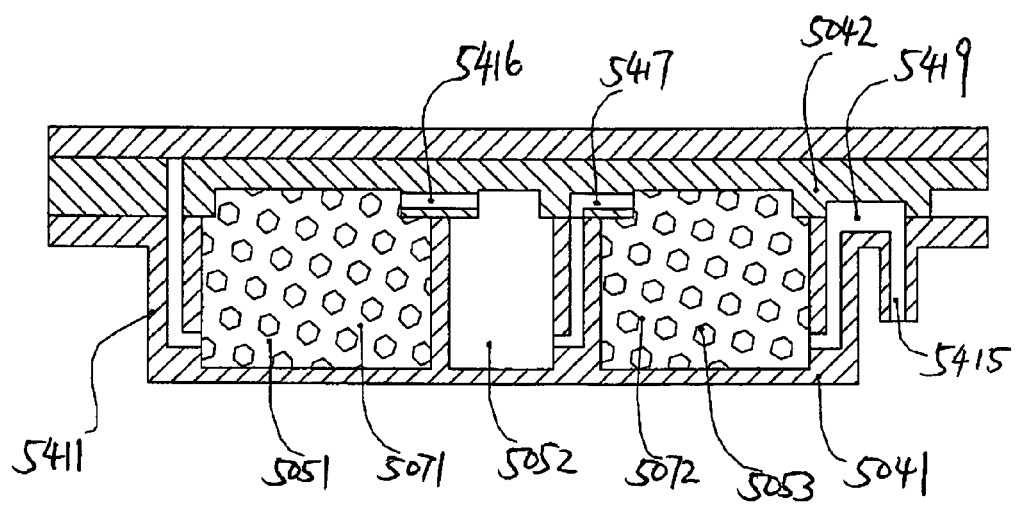
FIG. 27 is a sectional view of a second embodiment of a cover.

FIG. 27 shows a second embodiment of a cover of an ink cartridge. The second embodiment has substantially the same structures as the first embodiment. For easy reference, the same structures are referred to by the same names or denoted by the same reference characters as the first embodiment. The second embodiment differs from the first embodiment in that the projecting fence 5411 may be formed on an upper surface of the cover body 5041 located inside the ink cartridge. The space enclosed by the fence 5411 is separated into three portions by the partition wall 5412, 5413 forming three ink overflow buffer chambers 5051, 5052 and 5053. The ink overflow buffer chambers 5051 and 5053 receive therein two waterproof air-permeable materials 5071 and 5072 respectively. The concave grooves 5416, 5417, 5418 (not shown) and 5419 for fluid communicating the ink overflow buffer chambers 5051, 5052 and 5053 and the second air inlet 5415 may be provided on the thin sheet member 5042.

Figure 28:
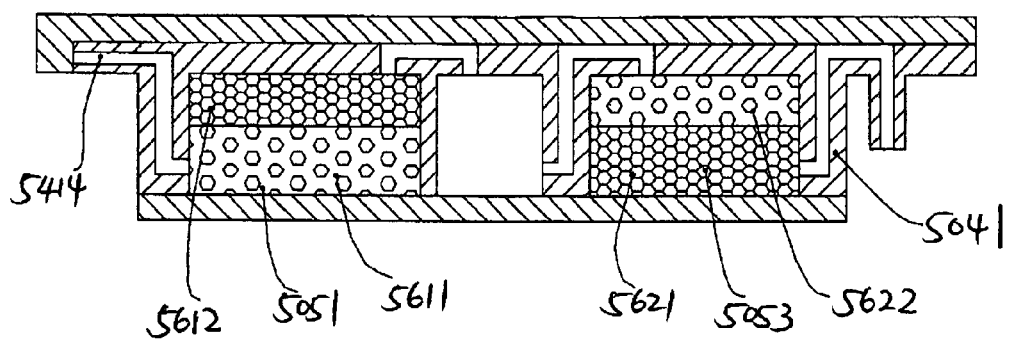
FIG. 28 is a sectional view of a third embodiment of a cover.

FIG. 28 shows a third embodiment of a cover of an ink cartridge. The third embodiment has substantially the same structures as the first embodiment. For easy reference, the same structures are referred to by the same names or denoted by the same reference characters as the first embodiment. The third embodiment differs from the first embodiment in that the first inlet 5414 can be provided on a side section of the cover body 5041, and the two layers of different ink absorbing materials 5611, 5612 and 5621, 5622 can be provided in the ink overflow buffer chambers 5051 and 5053 respectively.

The ink cartridges described herein can make use of the structure of the cover to provide multiple ink overflow buffer chambers on the cover, dispose different ink passages and different anti-leakage absorbing materials so as to maximize the anti-leakage capacity, and effectively obstruct the capillary phenomenon of the ink.

The above-mentioned embodiments are considered as illustrative only of principles of the ink cartridge, and non-limiting examples, the ink cartridge is of course susceptible of numerous modifications and variations. For example, the first air inlet may be provided on the thin sheet member, or both the ink absorption materials and the waterproof air-permeable materials are disposed in the ink overflow buffer chambers.

Various other modifications may be made to the exemplary embodiments discussed hereinbefore without departing from the spirit and scope of the present application. While the described embodiments refer to particular features, the scope of this application also includes embodiments having different combinations or features. Accordingly, the present application is intended to embrace all such alternatives, modifications, and variations as falling within the scope of the appended claims, and all equivalents thereof.

We claim:

1. A valve core of an ink cartridge with an ink supply port adapted to supply ink to a print head, the valve core comprising an elastic valve sheet and a valve stem, the elastic valve sheet comprising:
   an inner portion; and
   an outer portion extending outwards from the inner portion and protruding towards an upstream side of the valve core, wherein the upstream side of the valve core is distal to the ink supply port, the outer portion adapted to sealingly engage and disengage with a valve seat in which the valve core is mounted; and
   the valve stem disposed at a general central portion of the valve core;
   wherein the valve stem comprises a longitudinal passageway comprising a first end open to a downstream side of the valve core and a second end open to the upstream side of the valve core, wherein the downstream side of the valve core is proximal to the ink supply port, and the longitudinal passageway allows passage of ink from the downstream side to the upstream side of the valve core.

2. The valve core as claimed in claim 1 wherein the outer portion of the valve sheet comprises a generally C-shaped cross section.

3. The valve core as claimed in claim 1 wherein the inner portion of the valve sheet protrudes towards the downstream side of the valve core.

4. The valve core as claimed in claim 1 wherein the inner portion of the valve sheet is linear.

5. The valve core as claimed in claim 1 wherein the inner portion of the valve sheet protrudes slightly towards the upstream side of the valve core.

6. The valve core as claimed in claim 1 wherein:
   the inner portion of the valve sheet comprises an inner end adjacent to the generally central portion of the valve sheet;
   the valve sheet comprises an intermediate region at which the outer portion extends outwards from the inner portion; and
   the thickness of the inner portion decreases gradually from the inner end to the intermediate region.

7. The valve core as claimed in claim 1 wherein:
   the valve sheet comprises an intermediate region at which the outer portion extends outwards from the inner portion;
   the outer portion of the valve sheet comprises an edge and a protruding end between the intermediate region and the edge; and
   the thickness of the protruding end is equal to or less than the thickness of the intermediate region and the thickness of the edge.

8. The valve core as claimed in claim 7 wherein the thickness of the protruding end is from about 0.1 mm to about 0.5 mm.

9. The valve core as claimed in claim 7 wherein the thickness of the protruding end is from about 0.15 mm to about 0.25 mm.

10. The valve core as claimed in claim 1 wherein the outer portion of the valve sheet comprises a curved surface adapted to sealingly engage and disengage with an inner surface of the valve seat.

11. The valve core as claimed in claim 10 wherein the curved surface of the outer portion is adapted to sealingly engage with the inner surface of the valve seat in a tangent relationship.

12. The valve core as claimed in claim 1 wherein the outer portion of the valve sheet comprises an outer end remote to the generally central portion of the valve sheet, and the outer end is adapted to sealingly engage and disengage with an inner surface of the valve seat.

13. The valve core as claimed in claim 12 wherein the outer portion of the valve sheet is in a wavy configuration along a circumference thereof.

14. The valve core as claimed in claim 1 wherein the inner portion of the valve sheet comprises one or more concave portions protrudes towards a downstream side of the valve core and/or the upstream side of the valve core.

15. The valve core as claimed in claim 1 wherein the stem comprises a protruding portion and engaging portion allowing the valve core to be fixedly mounted in the valve seat.

16. The valve core as claimed in claim 15 wherein the passageway is a slit extending through the valve stem from the engaging portion to the protruding portion.

17. The valve core as claimed in claim 15 wherein the passageway is formed inside the valve stem and a valve stem extension extending from the protruding portion, and the second end of the longitudinal passageway is open to the upstream side of the valve core through a slit provided through a side wall of the valve stem extension.

18. A valve core of an ink cartridge with an ink supply port adapted to supply ink to a print head, the valve core comprising an elastic valve sheet and a valve stem disposed at a general central portion of the valve core, wherein the elastic valve sheet comprising:
   an inner portion protruding towards a downstream side of the valve core, wherein the downstream side of the valve core is proximal to the ink supply port, the inner portion comprising an inner end adjacent to a generally central portion of the valve sheet;
   an outer portion extending outwards from the inner portion and protruding towards an upstream side of the valve core, wherein the upstream side of the valve core is distal to the ink supply port, the outer portion adapted to sealingly engage and disengage with a valve seat in which the valve core is mounted; and
   an intermediate region at which the outer portion extends outwards from the inner portion, the thickness of the inner portion decreasing gradually from the inner end to the intermediate region;
   wherein the valve stem comprises a longitudinal passageway comprising a first end open to a downstream side of the valve core and a second end open to the upstream side of the valve core, and the longitudinal passageway allows passage of ink from the downstream side to the upstream side of the valve core.

19. The valve core as claimed in claim 18 wherein:
   the outer portion of the valve sheet comprises an edge and a protruding end between the intermediate region and the edge; and
   the thickness of the protruding end is equal to or less than the thickness of the intermediate region and the thickness of the edge.

20. A valve core of an ink cartridge with an ink supply port adapted to supply ink to a print head, the valve core comprising an elastic valve sheet and a valve stem disposed at a general central portion of the valve core, wherein the elastic valve sheet comprising:
   an inner portion protruding towards a downstream side of the valve core, wherein the downstream side of the valve core is proximal to the ink supply port, the inner portion comprising an inner end adjacent to a generally central portion of the valve sheet;
   an outer portion extending outwards from the inner portion and protruding towards an upstream side of the valve core, wherein the upstream side of the valve core is distal to the ink supply port;
   an intermediate region at which the outer portion extends outwards from the inner portion, the outer portion comprising an edge and a protruding end between the intermediate region and the edge, the thickness of the protruding end being equal to or less than the thickness of the intermediate region and the thickness of the edge, and the outer portion adapted to sealingly engage and disengage with a valve seat in which the valve core is mounted;
   wherein the valve stem comprises a longitudinal passageway comprising a first end open to a downstream side of the valve core and a second end open to the upstream side of the valve core, and the longitudinal passageway allows passage of ink from the downstream side to the upstream side of the valve core.

21. A valve core of an ink cartridge with an ink supply port adapted to supply ink to a print head, the valve core comprising:
   (a) a valve stem disposed at a general central portion of the valve core;
   (b) an elastic valve sheet comprising:
      an inner portion extending outwards from the valve stem and protruding towards a downstream side of the valve core, wherein the downstream side of the valve core is proximal to the ink supply port; and
      an outer portion extending outwards from the inner portion and protruding towards an upstream side of the valve core, wherein the upstream side of the valve core is distal to the ink supply port, the outer portion adapted to sealingly engage and disengage with a valve seat in which the valve core is mounted;
   wherein the valve stem comprises a longitudinal passageway comprising a first end open to a downstream side of the valve core and a second end open to the upstream side of the valve core, and the longitudinal passageway allows passage of ink from the downstream side to the upstream side of the valve core.

22. The valve core as claimed in claim 21 wherein:
   the inner portion of the valve sheet comprises an inner end adjacent to a generally central portion of the valve sheet;
   the valve sheet comprises an intermediate region at which the outer portion extends outwards from the inner portion; and
   the thickness of the inner portion decreases gradually from the inner end to the intermediate region.

23. The valve core as claimed in claim 21 wherein:
   the valve sheet comprises an intermediate region at which the outer portion extends outwards from the inner portion;
   the outer portion of the valve sheet comprises an edge and a protruding end between the intermediate region and the edge; and
   the thickness of the protruding end is equal to or less than the thickness of the intermediate region and the thickness of the edge.

24. A valve assembly of an ink cartridge with an ink supply port adapted to supply ink to a print head, the valve assembly comprising:
   (a) a valve core comprising an elastic valve sheet and a valve stem disposed at a general central portion of the valve core, wherein the valve sheet comprising (i) an inner portion and (ii) an outer portion extending outwards from the inner portion and protruding towards an upstream side of the valve core, wherein the upstream side of the valve core is distal to the ink supply port; and
   (b) a valve seat comprising a valve chamber in which the valve sheet of the valve core is disposed, the valve chamber comprising an inner surface, and the outer portion of the valve sheet adapted to sealingly engage and disengage with the inner surface of the valve chamber;
   wherein the valve stem comprises a longitudinal passageway comprising a first end open to a downstream side of the valve core and a second end open to the upstream side of the valve core, wherein the downstream side of the valve core is proximal to the ink supply port, and the longitudinal passageway allows passage of ink from the downstream side to the upstream side of the valve core.

25. The valve assembly as claimed in claim 24 wherein the outer portion of the valve sheet comprises a curved surface adapted to sealingly engage and disengage with the inner surface of the valve chamber.

26. The valve assembly as claimed in claim 24 wherein the outer portion of the valve sheet comprises an outer end remote to a generally central portion of the valve sheet, and the outer end is adapted to sealingly engage and disengage with the inner surface of the valve chamber.

27. The valve assembly as claimed in claim 24 wherein the inner surface of the valve chamber comprises a groove, and the outer portion of the valve sheet is adapted to sealingly engage and disengage with edges of the groove.

28. The valve assembly as claimed in claim 24 further comprising a filter positioned at the upstream side and/or the downstream side of the valve core.

29. The valve assembly as claimed in claim 24 further comprising a buffering member disposed at the upstream of the valve core, the buffering member shaped to reduce impact of ink on the valve sheet when the ink enters into the valve chamber.

30. An ink cartridge comprising:
(a) an ink supply chamber adapted to contain ink;
(b) an ink supply port adapted to supply the ink to a print head;
(c) a first valve assembly positioned between the ink supply chamber and the ink supply port, the first valve assembly comprising:
   (i) a valve core comprising an elastic valve sheet and a valve stem disposed at a general central portion of the valve core, wherein the valve sheet comprising:
      an inner portion, and
      an outer portion extending outwards from the inner portion and protruding towards an upstream side of the valve core, wherein the upstream side of the valve core is distal to the ink supply port; and
   (ii) a valve seat comprising a valve chamber in which the valve sheet of the valve core is disposed, the valve chamber comprising an inner surface, and the outer portion of the valve sheet adapted to sealingly engage and disengage with the inner surface of the valve chamber;
wherein the valve stem comprises a longitudinal passageway comprising a first end open to a downstream side of the valve core and a second end open to the upstream side of the valve core, wherein the downstream side of the valve core is proximal to the ink supply port, and the longitudinal passageway allows passage of ink from the downstream side to the upstream side of the valve core.

31. The ink cartridge as claimed in claim 30 wherein the valve seat of the valve assembly is integrally formed in a wall of the ink cartridge.

32. The ink cartridge as claimed in claim 30 further comprising a second valve assembly positioned between the ink supply chamber and the ink supply port, the second valve assembly oriented in a reversed direction to the first valve assembly.

33. The ink cartridge as claimed in claim 30 further comprising a cover covering the ink supply chamber and a third valve assembly disposed in the cover.

34. The ink cartridge as claimed in claim 30 further comprising a cover covering the ink supply chamber, the cover comprising a plurality of integral partition walls defining a plurality of ink overflow buffer chambers, and each ink overflow buffer chamber having an absorbing material provided therein.

35. The ink cartridge as claimed in claim 34 wherein the cover comprises a serpentine guiding air passage.

* * * * *